US012588008B2

(12) United States Patent
Wu et al.

(10) Patent No.: US 12,588,008 B2
(45) Date of Patent: Mar. 24, 2026

(54) METHOD AND DEVICE FOR TRANSMISSION CONFIGURATION INDICATOR-BASED CONTROL CHANNEL CANDIDATE MONITORING IN WIRELESS COMMUNICATION

(71) Applicant: APOGEE NETWORKS, LLC, Dallas, TX (US)

(72) Inventors: Lu Wu, Shanghai (CN); Xiaobo Zhang, Shanghai (CN)

(73) Assignee: APOGEE NETWORKS, LLC, Dallas, TX (US)

( * ) Notice: Subject to any disclaimer, the term of this patent is extended or adjusted under 35 U.S.C. 154(b) by 368 days.

(21) Appl. No.: 18/129,106

(22) Filed: Mar. 31, 2023

(65) Prior Publication Data

US 2023/0319791 A1  Oct. 5, 2023

(30) Foreign Application Priority Data

Apr. 2, 2022  (CN) .......................... 202210350698.4

(51) Int. Cl.
| | |
|---|---|
| *H04W 72/20* | (2023.01) |
| *H04L 5/00* | (2006.01) |
| *H04W 72/044* | (2023.01) |

(52) U.S. Cl.
CPC ......... *H04W 72/044* (2013.01); *H04L 5/0055* (2013.01); *H04W 72/20* (2023.01)

(58) Field of Classification Search
CPC ............... H04W 72/044; H04W 72/20; H04W 72/0446; H04W 72/0453; H04W 72/1263; H04L 5/0055; H04L 5/0053
See application file for complete search history.

(56) References Cited

U.S. PATENT DOCUMENTS

| | | | | |
|---|---|---|---|---|
| 2020/0313947 A1* | 10/2020 | Noh | ....................... | H04W 76/27 |
| 2020/0351841 A1* | 11/2020 | Cirik | .................... | H04B 7/0695 |
| 2022/0174509 A1* | 6/2022 | Noh | .................... | H04W 56/001 |
| 2023/0171611 A1* | 6/2023 | Matsumura | ............... | H04L 1/08 |
| | | | | 370/329 |
| 2023/0254716 A1* | 8/2023 | Khoshnevisan | ...... | H04W 16/28 |
| | | | | 370/329 |
| 2025/0048369 A1* | 2/2025 | Gao | ......................... | H04L 1/18 |

* cited by examiner

*Primary Examiner* — Edan Orgad
*Assistant Examiner* — Malick A Sohrab
(74) *Attorney, Agent, or Firm* — Volpe Koenig

(57) ABSTRACT

The present application discloses a method and a device in a node for wireless communications. A first node receives a first signaling; and receives a first signal; and transmits a first information block in a first time-frequency resource block. The first signaling is used for scheduling the first signal, and the first signaling is used for indicating the first time-frequency resource block, the first information block comprising a HARQ-ACK for the first signal; the first signaling is used to determine a first TCI state group; a number of the TCI state(s) comprised in the first TC state group is used to determine whether the first TC state group is used for monitoring at least one control channel candidate; when and only when the number of the TCI state(s) comprised in the first TCI state group is equal to 1, starting from a first time.

20 Claims, 5 Drawing Sheets

100

First node receiving first signaling —101 receiving first signal —102 transmitting first information block in first time-frequency resource block —103

100

First node receiving first signaling — 101 receiving first signal — 102 transmitting first information block in first time-frequency resource block — 103

5GS/EPS 200

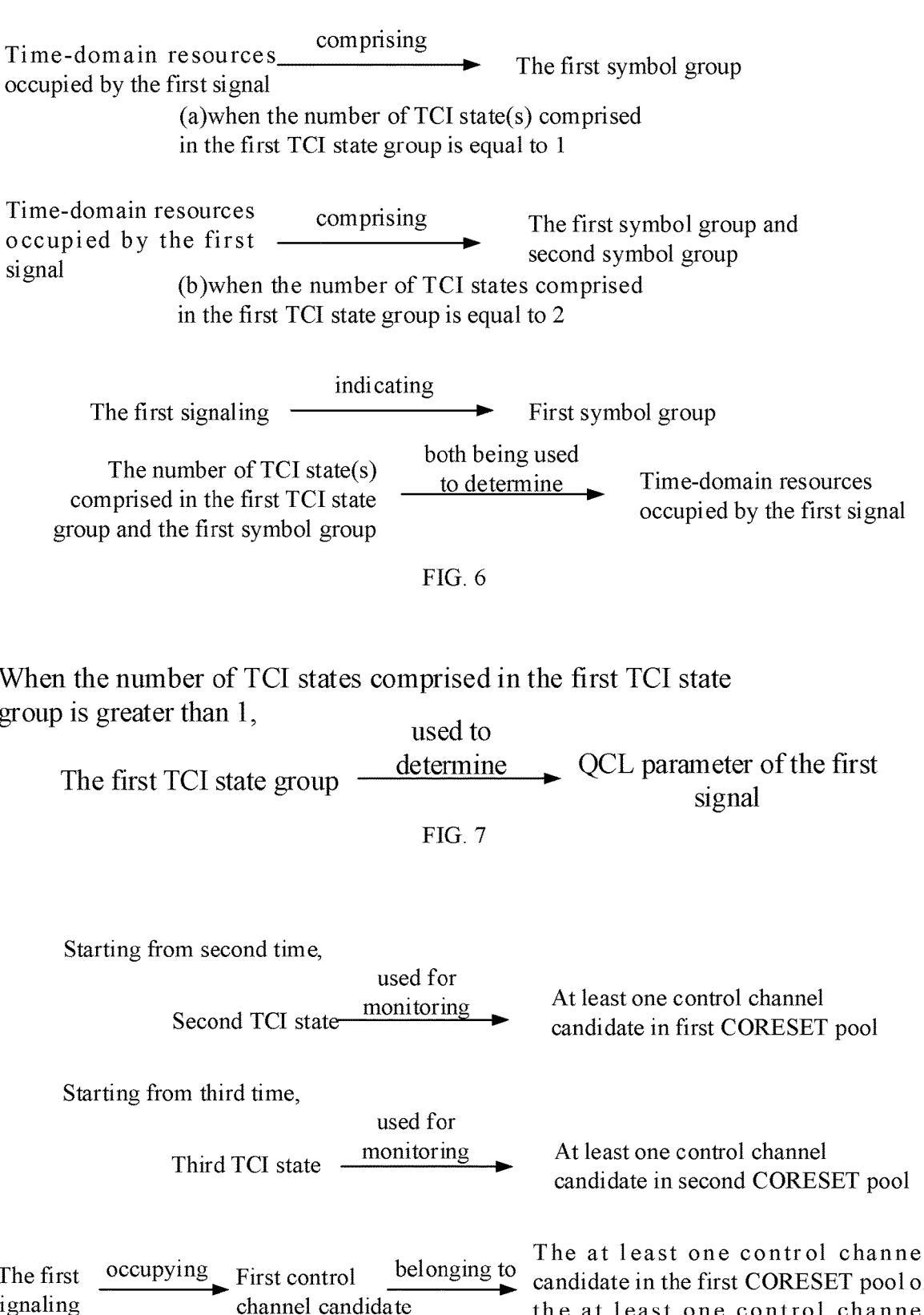

Time-domain resources occupied by the first signal —comprising→ The first symbol group (a)when the number of TCI state(s) comprised in the first TCI state group is equal to 1

Time-domain resources occupied by the first signal —comprising→ The first symbol group and second symbol group (b)when the number of TCI states comprised in the first TCI state group is equal to 2

The first signaling —indicating→ First symbol group

The number of TCI state(s) comprised in the first TCI state group and the first symbol group —both being used to determine→ Time-domain resources occupied by the first signal

FIG. 6

When the number of TCI states comprised in the first TCI state group is greater than 1, The first TCI state group —used to determine→ QCL parameter of the first signal

FIG. 7

Starting from second time,

Second TCI state —used for monitoring→ At least one control channel candidate in first CORESET pool Starting from third time, Third TCI state —used for monitoring→ At least one control channel candidate in second CORESET pool The first signaling —occupying→ First control channel candidate —belonging to→ The at least one control channel candidate in the first CORESET pool or the at least one control channel candidate in the second CORESET pool

FIG. 8

The second TCI state $\xrightarrow{\text{used to determine}}$ QCL parameter of the first signal (a)when the number of TCI state(s) comprised in the first TCI state group is equal to 1 and the first control channel candidate belongs to the at least one control channel candidate in the first CORESET pool The third TCI state $\xrightarrow{\text{used to determine}}$ QCL parameter of the first signal (b)when the number of TCI state(s) comprised in the first TCI state group is equal to 1 and the first control channel candidate belongs to the at least one control channel candidate in the second CORESET pool

FIG. 9

When the number of TCI states comprised in the first TCI state group is greater than 1,

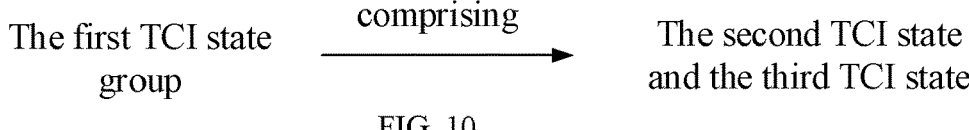

The first TCI state group $\xrightarrow{\text{comprising}}$ The second TCI state and the third TCI state

FIG. 10

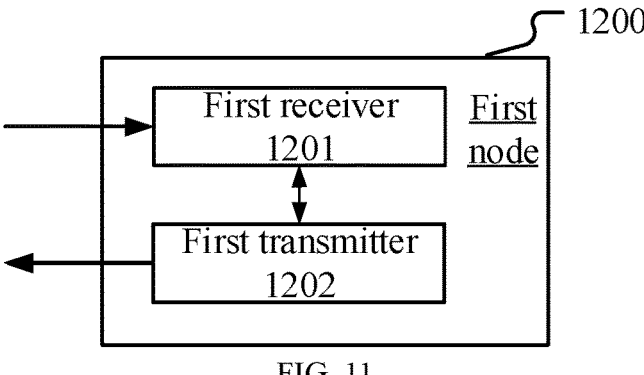

FIG. 11

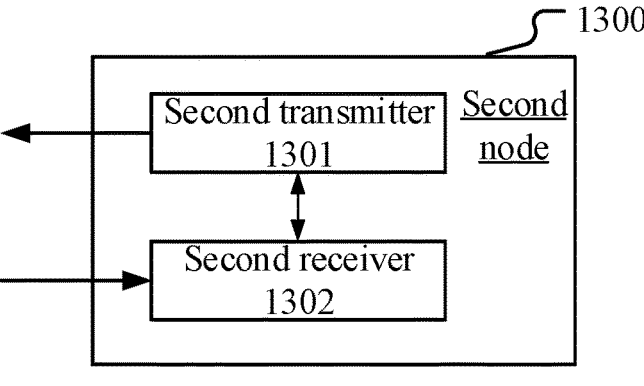

FIG. 12

METHOD AND DEVICE FOR TRANSMISSION CONFIGURATION INDICATOR-BASED CONTROL CHANNEL CANDIDATE MONITORING IN WIRELESS COMMUNICATION

CROSS REFERENCE TO RELATED APPLICATIONS

This application claims the priority benefit of Chinese Patent Application No. 202210350698.4, filed on Apr. 2, 2022, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In multi-Transmission Reception Point (multi-TRP)/multi-panel communications, the same channel or signal can be transmitted repeatedly through multiple beams for enhancement of the reliability of transmission. The NR Rel-16 supports the data channel in using multiple Transmission Configuration Indicator (TCI) states for repetitions of transmission, and the NR Rel-17 further supports the use of multiple TCI states for repetitions of transmission of the control channel.

SUMMARY

Inventors find through researches that how to indicate or update TCI state(s) used for monitoring control channel candidates is a key issue for the control channel.

To address the above problem, the present application provides a solution. It should be noted that though the present application only took the uplink and downlink as an exemplary scenario in the statement above, it is also applicable to other scenarios such as the sidelink, where similar technical effects can be achieved. Additionally, the adoption of a unified solution for various scenarios, including but not limited to UL, DL and SL, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling;

receiving a first signal; and transmitting a first information block in a first time-frequency resource block;

herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, a problem to be solved in the present application includes: how to indicate or update a TCI state used for monitoring control channel candidate(s).

According to one aspect of the present application, characterized in that the first signaling indicates a first symbol group; the number of the TCI state(s) comprised in the first TCI state group and the first symbol group are both used to determine time-domain resources occupied by the first signal; when the number of the TCI state(s) comprised in the first TCI state group is equal to 1, the time-domain resources occupied by the first signal comprise the first symbol group; when the number of the TCI state(s) comprised in the first TCI state group is equal to 2, the time-domain resources occupied by the first signal comprise the first symbol group and a second symbol group; the first symbol group and the second symbol group are mutually orthogonal in time domain, where a number of symbol(s) comprised in the second symbol group is equal to a number of symbol(s) comprised in the first symbol group.

According to one aspect of the present application, characterized in that when the number of the TCI state(s) comprised in the first TCI state group is greater than 1, the first TCI state group is used to determine a QCL parameter of the first signal.

According to one aspect of the present application, characterized in that starting from a second time, a second TCI state is used for monitoring at least one control channel candidate in a first CORESET pool; starting from a third time, a third TCI state is used for monitoring at least one control channel candidate in a second CORESET pool; the first signaling occupies a first control channel candidate, the first control channel candidate belonging to the at least one control channel candidate in the first CORESET pool or the at least one control channel candidate in the second CORE-SET pool; at least one CORESET in the first CORESET pool does not belong to the second CORESET pool; the first CORESET pool comprises at least one CORESET, and the second CORESET pool comprises at least one CORESET.

According to one aspect of the present application, characterized in comprising:

the first receiver, receiving a second signaling; and receiving a third signaling; and the first transmitter, transmitting a second information block in a second time-frequency resource block; and transmitting a third information block in a third time-frequency resource block;

herein, the second signaling is used to indicate the second time-frequency resource block, the second information block comprising a HARQ-ACK related to the second signaling; the third signaling is used to indicate the third time-frequency resource block, the third information block comprising a HARQ-ACK related to the third signaling; the second signaling is used to indicate the second TCI state, while the third signaling is used to indicate the third TCI state; the second time-frequency resource block is used to determine the second time, while the third time-frequency resource block is used to determine the third time.

According to one aspect of the present application, characterized in that when the number of the TCI state(s) comprised in the first TCI state group is equal to 1, and the first control channel candidate belongs to the at least one control channel candidate in the first CORESET pool, the second TCI state is used to determine a QCL parameter of the first signal; when the number of the TCI state(s) comprised in the first TCI state group is equal to 1, and the first control channel candidate belongs to the at least one control channel candidate in the second CORESET pool, the third TCI state is used to determine a QCL parameter of the first signal.

According to one aspect of the present application, characterized in that when the number of the TCI state(s) comprised in the first TCI state group is greater than 1, and the first TC state group comprises the second TCI state and the third TCI state.

The present application provides a method in a second node for wireless communications, comprising:

transmitting a first signaling;

transmitting a first signal; and receiving a first information block in a first time-frequency resource block;

herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

According to one aspect of the present application, characterized in that the first signaling indicates a first symbol group; the number of the TCI state(s) comprised in the first TCI state group and the first symbol group are both used to determine time-domain resources occupied by the first signal; when the number of the TCI state(s) comprised in the first TCI state group is equal to 1, the time-domain resources occupied by the first signal comprise the first symbol group; when the number of the TCI state(s) comprised in the first TCI state group is equal to 2, the time-domain resources occupied by the first signal comprise the first symbol group and a second symbol group; the first symbol group and the second symbol group are mutually orthogonal in time domain, where a number of symbol(s) comprised in the second symbol group is equal to a number of symbol(s) comprised in the first symbol group.

According to one aspect of the present application, characterized in that when the number of the TCI state(s) comprised in the first TCI state group is greater than 1, the first TCI state group is used to determine a QCL parameter of the first signal.

According to one aspect of the present application, characterized in that starting from a second time, a second TCI state is used for monitoring at least one control channel candidate in a first CORESET pool; starting from a third time, a third TCI state is used for monitoring at least one control channel candidate in a second CORESET pool; the first signaling occupies a first control channel candidate, the first control channel candidate belonging to the at least one control channel candidate in the first CORESET pool or the at least one control channel candidate in the second CORE-SET pool; at least one CORESET in the first CORESET pool does not belong to the second CORESET pool; the first CORESET pool comprises at least one CORESET, and the second CORESET pool comprises at least one CORESET.

According to one aspect of the present application, characterized in comprising:

the second transmitter, transmitting a second signaling; and transmitting a third signaling; and the second receiver, receiving a second information block in a second time-frequency resource block; and receiving a third information block in a third time-frequency resource block;

herein, the second signaling is used to indicate the second time-frequency resource block, the second information block comprising a HARQ-ACK related to the second signaling; the third signaling is used to indicate the third time-frequency resource block, the third information block comprising a HARQ-ACK related to the third signaling; the second signaling is used to indicate the second TCI state, while the third signaling is used to indicate the third TCI state; the second time-frequency resource block is used to determine the second time, while the third time-frequency resource block is used to determine the third time.

According to one aspect of the present application, characterized in that when the number of the TCI state(s) comprised in the first TCI state group is equal to 1, and the first control channel candidate belongs to the at least one control channel candidate in the first CORESET pool, the second TCI state is used to determine a QCL parameter of the first signal; when the number of the TCI state(s) comprised in the first TCI state group is equal to 1, and the first control channel candidate belongs to the at least one control channel candidate in the second CORESET pool, the third TCI state is used to determine a QCL parameter of the first signal.

According to one aspect of the present application, characterized in that when the number of the TCI state(s)

comprised in the first TCI state group is greater than 1, and the first TC state group comprises the second TCI state and the third TCI state.

The present application provides a first node for wireless communications, comprising:

a first receiver, receiving a first signaling; and receiving a first signal; and a first transmitter, transmitting a first information block in a first time-frequency resource block;

herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

The present application provides a second node for wireless communications, comprising:

a second transmitter, transmitting a first signaling; and transmitting a first signal; and a second receiver, receiving a first information block in a first time-frequency resource block;

herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, compared with the prior art, the present application is advantageous in the following aspects:

flexibly indicating or updating TCI state(s) used for monitoring control channel candidates;

supporting one or more TCI states to be used for transmitting scheduled signals;

flexibly supporting multiple schemes for transmitting scheduled signals.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a schematic diagram of a relation between a first TCI state group and a first signal according to one embodiment of the present application.

FIG. 7 illustrates a schematic diagram of a QCL parameter of a first signal according to one embodiment of the present application.

FIG. 8 illustrates a schematic diagram of a relation between a second TCI state and a first CORESET pool, and a relation between a third TCI state and a second CORESET pool according to one embodiment of the present application.

FIG. 9 illustrates a schematic diagram of a QCL parameter of a first signal according to another embodiment of the present application.

FIG. 10 illustrates a schematic diagram of a first signaling used to determine a first TCI state group according to one embodiment of the present application.

FIG. 11 illustrates a structure block diagram of a processing device in a first node according to one embodiment of the present application.

FIG. 12 illustrates a structure block diagram of a processing device used in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
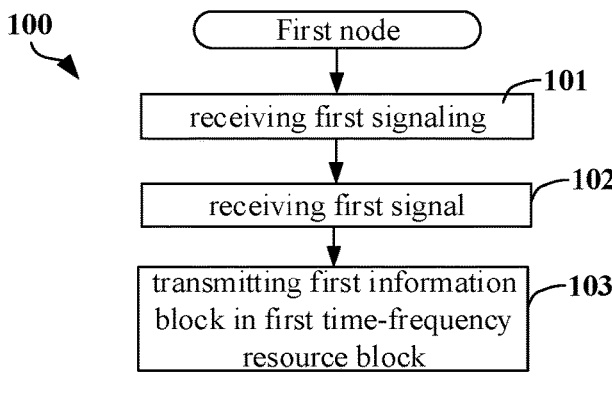
FIG. 1 illustrates a flowchart of a first signaling, a first signal and a first information block according to one embodiment of the present application.

Embodiment 1 illustrates a flowchart of a first signaling, a first signal and a first information block according to one embodiment of the present application, as shown in FIG. 1. In 100 illustrated by FIG. 1, each box represents a step.

In Embodiment 1, the first node in the present application receives a first signaling in step 101; receives a first signal in step 102; and transmits a first information block in a first time-frequency resource block in step 103; herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the first signaling is a higher layer signaling.

In one embodiment, the first signaling is a physical layer signaling.

In one embodiment, the first signaling is a Downlink Control Information (DCI) signaling.

In one embodiment, the first signaling is a Sidelink Control Information (SCI) signaling.

In one embodiment, the first signaling comprises scheduling information for the first signal.

In one embodiment, the first signaling is transmitted on a Physical Downlink Control CHannel (PDCCH).

In one embodiment, the first signaling is transmitted on a Physical Sidelink Control CHannel (PSCCH).

In one embodiment, the first signal comprises a Physical Downlink Shared Channel (PDSCH) transmission.

In one embodiment, the first signal comprises a Physical Sidelink Shared CHannel (PSSCH) transmission.

In one embodiment, the first signal carries a first bit block, the first bit block comprising at least one bit.

In one embodiment, the first bit block comprises one Transport Block (TB).

In one embodiment, the first bit block comprises at least one Transport Block (TB).

In one embodiment, the first bit block comprises one Code block group (CBG).

In one embodiment, the first bit block comprises at least one CBG.

In one embodiment, scheduling information of the first signal comprises at least one of time-domain resources being occupied, frequency-domain resources being occupied, a Modulation and Coding Scheme (MCS), an antenna port, a Hybrid Automatic Repeat reQuest (HARQ) process number, a Redundancy Version (RV) or a New Data Indicator (NDI).

In one embodiment, scheduling information of the first signal comprises at least one of time-domain resources being occupied, frequency-domain resources being occupied, a Modulation and Coding Scheme (MCS), an antenna port, a Hybrid Automatic Repeat reQuest (HARQ) process number, a Redundancy Version (RV), a New Data Indicator (NDI), or a TCI state.

In one embodiment, the first time-frequency resource block comprises a Physical Uplink Control Channel (PUCCH) resource.

In one embodiment, the first time-frequency resource block comprises a Physical Sidelink Feedback CHannel (PSFCH) resource.

In one embodiment, the first information block comprises Uplink Control Information (UCI).

In one embodiment, the first information block comprises control information.

In one embodiment, the first information block only comprises a HARQ-ACK for the first signal.

In one embodiment, the first information block also comprises information other than a HARQ-ACK for the first signal.

In one embodiment, the HARQ-ACK for the first signal is an ACK.

In one embodiment, the HARQ-ACK for the first signal is an ACK or a NACK.

In one embodiment, the HARQ-ACK for the first signal indicates that the first signal is correctly received.

In one embodiment, the HARQ-ACK for the first signal indicates whether the first signal is correctly received.

In one embodiment, the first time-frequency resource block comprises at least one Resource Element (RE).

In one embodiment, the first signaling comprises a second field, the second field in the first signaling being used to indicate the first time-frequency resource block; the second field comprises at least one bit.

In one embodiment, the second field is a PUCCH resource indicator field.

In one embodiment, the specific definition of the PUCCH resource indicator field can be found in 3GPP TS38.212, section 7.3.

In one embodiment, the first signaling is used for indicating a first TCI state group.

In one embodiment, the first signaling explicitly or implicitly indicates a first TCI state group.

In one embodiment, at least one field in the first signaling is used to determine a first TCI state group, where a field comprises at least one bit.

In one embodiment, at least one field in the first signaling is used to determine a first TCI state group, where a field comprises at least one bit.

In one embodiment, at least one field in the first signaling is used for indicating a first TCI state group.

In one embodiment, the at least one field in the first signaling includes a first field, the first field comprising at least one bit.

In one embodiment, the first signaling comprises a first field, the first field in the first signaling being used to determine a first TCI state group; the first field comprising at least one bit.

In one embodiment, the first signaling comprises a first field, the first field in the first signaling being used to indicate a first TCI state group; the first field comprising at least one bit.

In one embodiment, the name of the first field includes Transmission Configuration Indication.

In one embodiment, the name of the first field includes TCI.

In one embodiment, the first field is a Transmission Configuration Indication field.

In one embodiment, the specific definition of the Transmission Configuration Indication field can be found in 3GPP TS38.212, section 7.3.

In one embodiment, the first field comprises N codepoints, and N1 codepoint(s) of the N codepoints corresponds/respectively correspond to N1 TCI state group(s), where N is a positive integer greater than 1, and N1 is a positive integer no greater than N.

In one embodiment, a number of TCI state(s) comprised in each one of the N1 TCI state group(s) is equal to 1.

In one embodiment, any TCI state group of the N1 TCI state group(s) comprises one or more TCI states.

In one embodiment, a number of bit(s) comprised in the first field is a minimum integer no less than "logarithm of the N1 to the base 2".

In one embodiment, a number of bit(s) comprised in the first field is "logarithm of the N to the base 2".

In one embodiment, the first TCI state group is one of the N1 TCI state group(s).

In one embodiment, the first TCI state group is one of the N1 TCI state group(s), or, the first TCI state group is not any of the N1 TCI state group(s).

In one embodiment, a number of TCI state(s) comprised in each one of the N1 TCI state group(s) is equal to 1; the first TCI state group is one of the N1 TCI state group(s) and the number of TCI state(s) comprised in the first TCI state group is equal to 1, or, the first TCI state group is not any of the N1 TCI state group(s) and the number of TCI state(s) comprised in the first TCI state group is greater than 1.

In one embodiment, a number of TCI state(s) comprised in each one of the N1 TCI state group(s) is equal to 1; when and only when the first TCI state group is one of the N1 TCI state group(s), the number of TCI state(s) comprised in the first TCI state group is equal to 1.

In one embodiment, a value of the first field in the first signaling is one of the N1 codepoint(s), and the first TCI state group is a TCI state group corresponding to the value of the first field in the first signaling among the N1 TCI state group(s).

In one embodiment, the first field comprises N codepoints, and N1 codepoint(s) of the N codepoints corresponds/respectively correspond to N1 TCI state group(s), where N is a positive integer greater than 1, and N1 is a positive integer no greater than N; a value of the first field in the first signaling is one of the N1 codepoint(s), and the first TCI state group is a TCI state group corresponding to the value of the first field in the first signaling among the N1 TCI state group(s).

In one embodiment, the first field comprises N codepoints, the N codepoints comprising N1 codepoint(s) and N2 codepoint(s), where N is a positive integer greater than 1, N1 is a positive integer less than N, and N2 is a positive integer less than N, a sum of the N1 and N2 being no greater than the N.

In one subembodiment, any one of the N1 codepoint(s) does not belong to the N2 codepoint(s).

In one subembodiment, N1 is equal to 1, the N1 codepoint(s) corresponding to one TCI state group; or, N1 is greater than 1, the N1 codepoints respectively corresponding to N1 TCI state groups.

In one subembodiment, N2 is equal to 1, the N2 codepoint(s) corresponding to one TCI state group; or, N2 is greater than 1, the N2 codepoints respectively corresponding to N2 TCI state groups.

In one subembodiment, N2 is equal to 1, the N2 codepoint(s) corresponding to information other than TCI state(s); or, N2 is greater than 1, any of the N2 codepoints corresponding to information other than TCI state(s).

In one subembodiment, N2 is equal to 1.

In one subembodiment, N2 is equal to 2.

In one subembodiment, N2 is greater than 1.

In one subembodiment, N2 is equal to 1, the N2 codepoint(s) not corresponding to one TCI state; or, N2 is greater than 1, any of the N2 codepoints not corresponding to one TCI state.

In one subembodiment, N2 is equal to 1, the N2 codepoint(s) corresponding to CORESET-related information; or, N2 is greater than 1, at least one of the N2 codepoints corresponding to CORESET-related information.

In one subembodiment, N2 is equal to 1, the N2 codepoint(s) corresponding to information related to control channel candidate(s); or, N2 is greater than 1, at least one of the N2 codepoints corresponding to information related to control channel candidate(s).

In one subembodiment, N2 is equal to 1, the N2 codepoint(s) corresponding to PDCCH-related information; or, N2 is greater than 1, at least one of the N2 codepoints corresponding to PDCCH-related information.

In one subembodiment, N2 is equal to 1, the N2 codepoint(s) corresponding to at least one of a second TCI state or a third TCI state; or, N2 is greater than 1, at least one of the N2 codepoints corresponding to at least one of a second TCI state or a third TCI state; the second TCI state is used for monitoring at least one control channel candidate in a first CORESET pool, while the third TCI state is used for monitoring at least one control channel candidate in a second CORESET pool.

In one subembodiment, N2 is equal to 1, the N2 codepoint(s) corresponding to a second TCI state and a third TCI state; or, N2 is greater than 1, at least one of the N2 codepoints corresponding to a second TCI state and a third TCI state; the second TCI state is used for monitoring at least one control channel candidate in a first CORESET pool, while the third TCI state is used for monitoring at least one control channel candidate in a second CORESET pool.

In one subembodiment, N2 is equal to 1, the N2 codepoint(s) corresponding to an index of a first CORESET pool and an index of a second CORESET pool; or, N2 is greater than 1, any of the N2 codepoints corresponding to an index of a first CORESET pool and an index of a second CORESET pool.

In one subembodiment, N2 is equal to 1, the N2 codepoint(s) corresponding to at least one of an index of a first CORESET pool or an index of a second CORESET pool; or, N2 is greater than 1, any of the N2 codepoints corresponding to at least one of an index of a first CORESET pool or an index of a second CORESET pool.

In one subembodiment, N2 is equal to 1, the N2 codepoint(s) corresponding to an order of an index of a first CORESET pool and an index of a second CORESET pool; or, N2 is greater than 1, any of the N2 codepoints corresponding to an order of an index of a first CORESET pool and an index of a second CORESET pool.

In one subembodiment, N2 is greater than 1, where one of the N2 codepoints corresponds to (an index of a first CORESET pool, an index of a second CORESET pool), and one of the N2 codepoints corresponds to (an index of a second CORESET pool, an index of a first CORESET pool).

In one embodiment, when a value of the first field in the first signaling is one of the N1 codepoint(s), the first TCI state group is a TCI state group corresponding to the value of the first field in the first signaling among the N1 TCI state group(s).

In one subembodiment, when a value of the first field in the first signaling is one of the N2 codepoint(s), the first TCI state group comprises a second TCI state and a third TCI state; the second TCI state is used for monitoring at least one control channel candidate in a first CORESET pool, while the third TCI state is used for monitoring at least one control channel candidate in a second CORESET pool.

In one embodiment, when a value of the first field in the first signaling is one of the N1 codepoint(s), the number of TCI state(s) comprised in the first TCI state group is equal to 1; when the value of the first field in the first signaling is one of the N2 codepoint(s), the number of TCI state(s) comprised in the first TCI state group is greater than 1.

In one embodiment, when a value of the first field in the first signaling is one of the N1 codepoint(s), the first field in the first signaling indicates the first TCI state group, and the number of TCI state(s) comprised in the first TCI state group is equal to 1.

In one embodiment, when a value of the first field in the first signaling is one of the N2 codepoint(s), the number of TCI state(s) comprised in the first TCI state group is greater than 1, and the first TCI state group is indicated by two signalings other than the first signaling.

In one embodiment, when a value of the first field in the first signaling is one of the N2 codepoint(s), the number of TCI state(s) comprised in the first TCI state group is greater than 1, and the first TCI state group is indicated by the second signaling and the third signaling.

In one embodiment, any codepoint in the first field is a non-negative integer.

In one embodiment, any codepoint in the first field is a sequence.

In one embodiment, any codepoint in the first field is a bit sequence.

In one embodiment, any codepoint in the first field corresponds to a value within a range of values of the first field.

In one embodiment, any codepoint in the first field is a value within a range of values of the first field.

In one embodiment, any codepoint in the first field is a sequence made up of values of all bits comprised in the first field.

In one embodiment, information corresponding to a codepoint in the first field is configured by a higher layer signaling.

In one embodiment, the correspondence between the N1 codepoint(s) in the first field and the N1 TCI state group(s) is configured by a higher layer signaling.

In one embodiment, information respectively corresponding to the N1 codepoint(s) and the N2 codepoint(s) in the first field are configured by a higher layer signaling.

In one embodiment, the correspondence between a codepoint in the first field and a TCI state group is configured by a higher layer signaling.

In one embodiment, when and only when the number of TCI state(s) comprised in the first TCI state group is equal to 1, starting from a first time, the first TCI state group is used for monitoring at least one control channel candidate as well as receiving (a) signal(s) scheduled by control signaling(s) on the at least one control channel candidate, the first time-frequency resource block being used to determine the first time.

In one embodiment, when and only when the number of TCI state(s) comprised in the first TCI state group is equal to 1, starting from a first time, the first TCI state group is used for monitoring at least one control channel candidate as well as receiving (a) PDSCH(s) scheduled by DCI signaling(s) on the at least one control channel candidate, the first time-frequency resource block being used to determine the first time.

In one embodiment, the number of TCI state(s) comprised in the first TCI state group is used to determine whether the first TCI state group is used to determine a QCL parameter of the first signal or used to monitor the at least one control channel candidate; when the number of the TCI state(s) comprised in the first TCI state group is equal to 1, the first TCI state group is used for monitoring the at least one control channel candidate; when the number of the TCI state(s) comprised in the first TCI state group is greater than 1, the first TCI state group is used for determining a QCL parameter of the first signal.

In one embodiment, when the number of the TCI state(s) comprised in the first TCI state group is greater than 1, the first signaling is not used for updating a TCI state of any control channel candidate.

In one embodiment, when the number of the TCI state(s) comprised in the first TCI state group is greater than 1, a TCI state of any control channel candidate is not updated as the first TCI state group.

In one embodiment, the number of TCI state(s) comprised in the first TCI state group is used to determine whether the first TCI state group is only used to monitor or receive a first physical channel or used to monitor or receive the first physical channel and a second physical channel; when the number of the TCI state(s) comprised in the first TCI state group is equal to 1, the first TCI state group is used for monitoring or receiving the first physical channel and the second physical channel; when the number of the TCI state(s) comprised in the first TCI state group is greater than 1, the first TCI state group is used for monitoring or receiving the first physical channel.

In one subembodiment, the first physical channel is a PDSCH, and the second physical channel is a PDCCH.

In one subembodiment, the first physical channel is a PSSCH, and the second physical channel is a PDCCH.

In one subembodiment, the first physical channel is a PSSCH, and the second physical channel is a PSCCH.

In one subembodiment, when the number of the TCI state(s) comprised in the first TCI state group is greater than 1, the first physical channel is a PDSCH scheduled by the first signaling.

In one subembodiment, when the number of the TCI state(s) comprised in the first TCI state group is greater than 1, the first physical channel is a PSSCH scheduled by the first signaling.

In one subembodiment, when the number of the TCI state(s) comprised in the first TCI state group is equal to 1, the first physical channel is a PDCCH, while the second physical channel is a PDSCH scheduled by a DCI signaling on the first physical channel.

In one subembodiment, when the number of the TCI state(s) comprised in the first TCI state group is equal to 1, the first physical channel is a PDCCH, while the second physical channel is a PSSCH scheduled by a DCI signaling on the first physical channel.

In one subembodiment, when the number of the TCI state(s) comprised in the first TCI state group is equal to 1, the first physical channel is a PSCCH, while the second physical channel is a PSSCH scheduled by an SCI signaling on the first physical channel.

In one embodiment, the sentence that "the first time-frequency resource block is used to determine the first time" includes a meaning that the first time is a start time of a first slot following at least a first interval value after a last symbol in the first time-frequency resource block.

In one embodiment, the sentence that "the first time-frequency resource block is used to determine the first time" includes a meaning that the first time is a start time of a first slot following at least a first interval value after a slot to which the first time-frequency resource block belongs in time domain.

In one embodiment, the sentence that "the first time-frequency resource block is used to determine the first time" includes a meaning that the first time is a start time of a first slot following at least a first interval value after a first symbol in the first time-frequency resource block.

In one embodiment, the sentence that "the first time-frequency resource block is used to determine the first time" includes a meaning that the first time is a start time of a first time unit following at least a first interval value after an end time of the first time-frequency resource block.

In one embodiment, the sentence that "the first time-frequency resource block is used to determine the first time" includes a meaning that the first time is a start time of a first time unit following at least a first interval value after a start time of the first time-frequency resource block.

In one embodiment, "after a symbol" means: being later than the symbol in time; "after a time" means: being later than the time.

In one embodiment, "after a symbol" means: being no earlier than the symbol in time; "after a time" means: being no earlier than the time.

In one embodiment, a said time unit is a slot.

In one embodiment, a said time unit is a sub-slot.

In one embodiment, a said time unit is a symbol.

In one embodiment, a said time unit comprises more than one consecutive symbols.

In one embodiment, the number of symbols comprised in a said time unit is configured by a higher-layer parameter.

In one embodiment, the first interval value is measured in the time unit.

In one embodiment, the first interval value is measured in slot(s).

In one embodiment, the first interval value is measured in symbol(s).

In one embodiment, the first interval value is measured in millisecond(s) (ms).

In one embodiment, the first interval value is a positive integer.

In one embodiment, the first interval value is a positive real number.

In one embodiment, the first interval value is fixed.

In one embodiment, the first interval value is configured by a higher layer parameter.

In one embodiment, the first interval value is BeamApp-Time_r17.

In one embodiment, the first interval value is configured by a higher layer parameter beamAppTime-r17.

In one embodiment, the symbol is a single-carrier symbol.

In one embodiment, the symbol is a multi-carrier symbol.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

Embodiment 2

Figure 2:
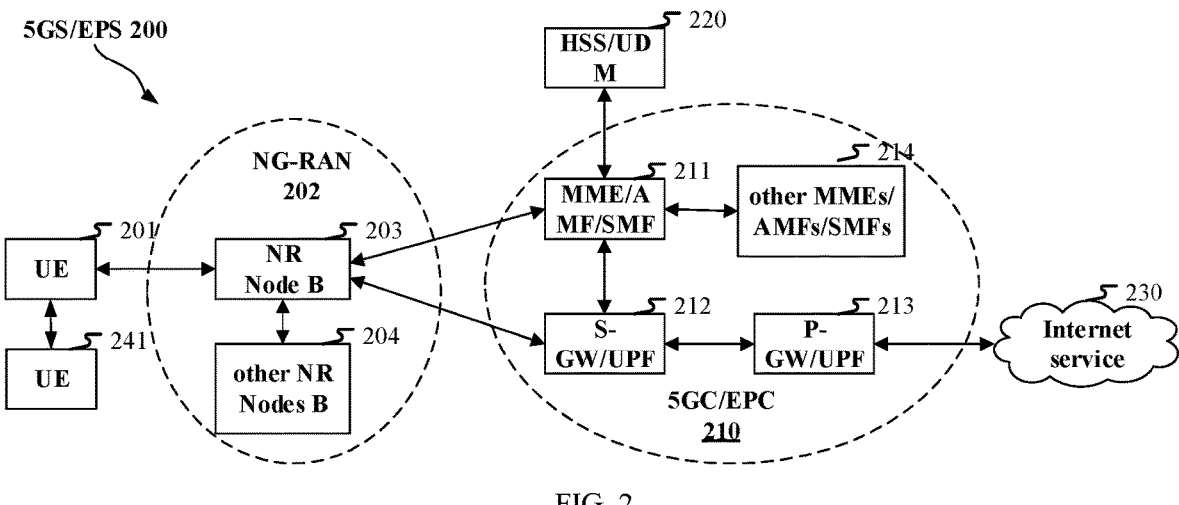
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture 200 of Long-Term Evolution (LTE), Long-Term Evolution Advanced (LTE-A) and future 5G systems. The network architecture 200 LTE, LTE-A and future 5G systems may be called an Evolved Packet System (EPS) 200. The 5G NR or LTE network architecture 200 may be called a 5G System/Evolved Packet System (5GS/EPS) 200 or other suitable terminology. The 5GS/EPS 200 may comprise one or more UEs 201, a UE 241 in sidelink communication with UE(s) 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services. The NG-RAN202 comprises a New Radio (NR) node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called abase station, abase transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the first node in the present application includes the UE 241.

In one embodiment, the second node in the present application includes the gNB203.

Embodiment 3

Figure 3:
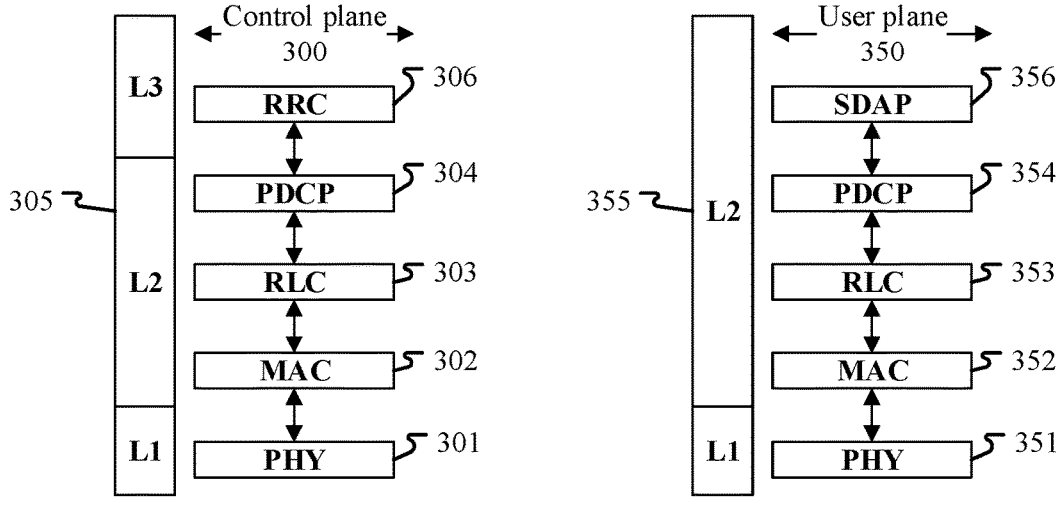
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first communication node and a second communication node as well as between two UEs. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service DataAdaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the RRC sublayer 306.

In one embodiment, the first signaling is generated by the MAC sublayer 302.

In one embodiment, the first signaling is generated by the MAC sublayer 352.

In one embodiment, the first signaling is generated by the PHY 301, or the PHY 351.

In one embodiment, the second signaling is generated by the RRC sublayer 306.

In one embodiment, the second signaling is generated by the MAC sublayer 302.

In one embodiment, the second signaling is generated by the MAC sublayer 352.

In one embodiment, the second signaling is generated by the PHY 301, or the PHY 351.

In one embodiment, the third signaling is generated by the RRC sublayer 306.

In one embodiment, the third signaling is generated by the MAC sublayer 302.

In one embodiment, the third signaling is generated by the MAC sublayer 352.

In one embodiment, the third signaling is generated by the PHY 301, or the PHY 351.

In one embodiment, the first information block is generated by the PHY 301, or the PHY 351.

In one embodiment, the second information block is generated by the PHY 301, or the PHY 351.

In one embodiment, the third information block is generated by the PHY 301, or the PHY 351.

In one embodiment, the first signal is generated by the PHY 301, or the PHY 351.

Embodiment 4

Figure 4:
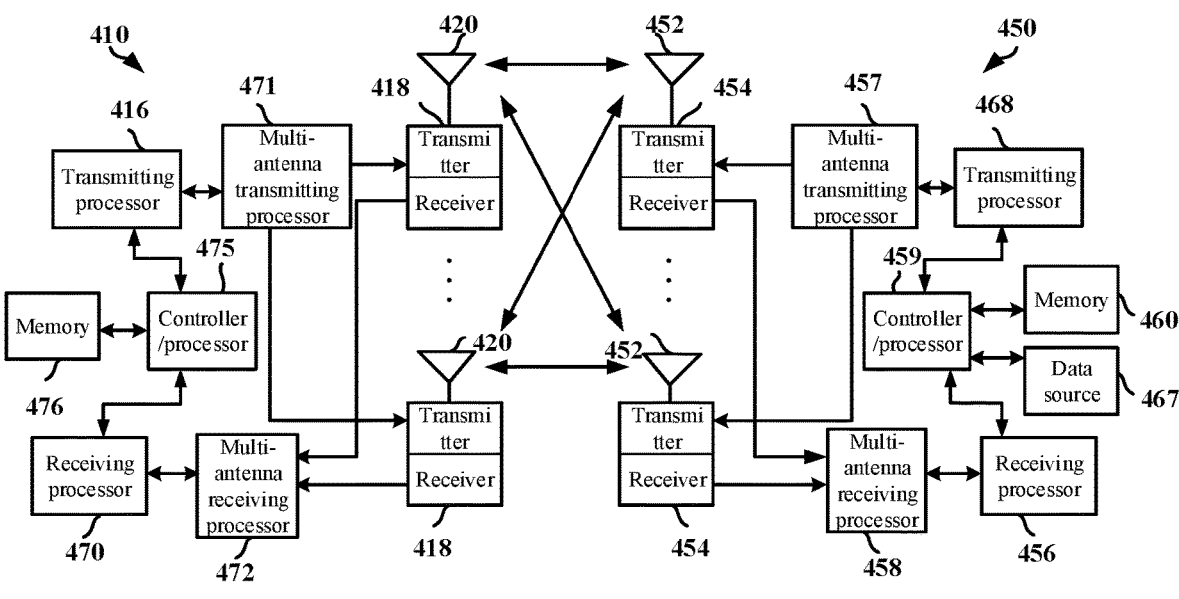
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/ processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling; and receives a first signal; and transmits a first information block in a first time-frequency resource block; herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TC state group is used to determine whether the first TC state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the second communication device 450 comprises a memory that stores computer readable instruction program, the computer readable instruction program generates an action when executed by at least one processor, which includes: receiving a first signaling; and receiving a first signal; and transmitting a first information block in a first time-frequency resource block; herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TC state group is used to determine whether the first TC state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits a first signaling; and transmits a first signal; and receives a first information block in a first time-frequency resource block; herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TC state group is used to determine whether the first TC state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the first communication device 410 comprises a memory that stores computer readable instruction program, the computer readable instruction program generates an action when executed by at least one processor, which includes: transmitting a first signaling; and transmitting a first signal; and receiving a first information block in a first time-frequency resource block; herein, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TC state group is used to determine whether the first TC state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the first node in the present application comprises the second communication device 450.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling in the present application; at least one of the antenna 420, the transmitter 418, the transmitting processor 416, the multi-antenna transmitting processor 471, the controller/processor 475 or the memory 476 is used to transmit the first signaling in the present application.

In one embodiment, at least one of the antenna 452, the receiver 454, the receiving processor 456, the multi-antenna receiving processor 458, the controller/processor 459, the memory 460 or the data source 467 is used to receive the second signaling in the present application; at least one of the antenna 420, the transmitter 418, the transmitting processor 416, the multi-antenna transmitting processor 471, the controller/processor 475 or the memory 476 is used to transmit the second signaling in the present application.

In one embodiment, at least one of the antenna 452, the receiver 454, the receiving processor 456, the multi-antenna receiving processor 458, the controller/processor 459, the memory 460 or the data source 467 is used to receive the third signaling in the present application; at least one of the antenna 420, the transmitter 418, the transmitting processor 416, the multi-antenna transmitting processor 471, the controller/processor 475 or the memory 476 is used to transmit the third signaling in the present application.

In one embodiment, at least one of the antenna 452, the receiver 454, the receiving processor 456, the multi-antenna receiving processor 458, the controller/processor 459, the memory 460 or the data source 467 is used to receive the first signal in the present application; at least one of the antenna 420, the transmitter 418, the transmitting processor 416, the multi-antenna transmitting processor 471, the controller/processor 475 or the memory 476 is used to transmit the first signal in the present application.

In one embodiment, at least one of the antenna 452, the transmitter 454, the transmitting processor 468, the multi-antenna transmitting processor 457, the controller/processor 459, or the memory 460 is used to transmit the first information block in the first time-frequency resource block in the present application; at least one of the antenna 420, the receiver 418, the receiving processor 470, the multi-antenna receiving processor 472, the controller/processor 475 or the memory 476 is used to receive the first information block in the first time-frequency resource block in the present application.

In one embodiment, at least one of the antenna 452, the transmitter 454, the transmitting processor 468, the multi-antenna transmitting processor 457, the controller/processor 459, or the memory 460 is used to transmit the second information block in the second time-frequency resource block in the present application; at least one of the antenna 420, the receiver 418, the receiving processor 470, the multi-antenna receiving processor 472, the controller/processor 475 or the memory 476 is used to receive the second information block in the second time-frequency resource block in the present application.

In one embodiment, at least one of the antenna 452, the transmitter 454, the transmitting processor 468, the multi-antenna transmitting processor 457, the controller/processor 459, or the memory 460 is used to transmit the third information block in the third time-frequency resource block in the present application; at least one of the antenna 420, the receiver 418, the receiving processor 470, the multi-antenna receiving processor 472, the controller/processor 475 or the memory 476 is used to receive the third information block in the third time-frequency resource block in the present application.

Embodiment 5

Figure 5:
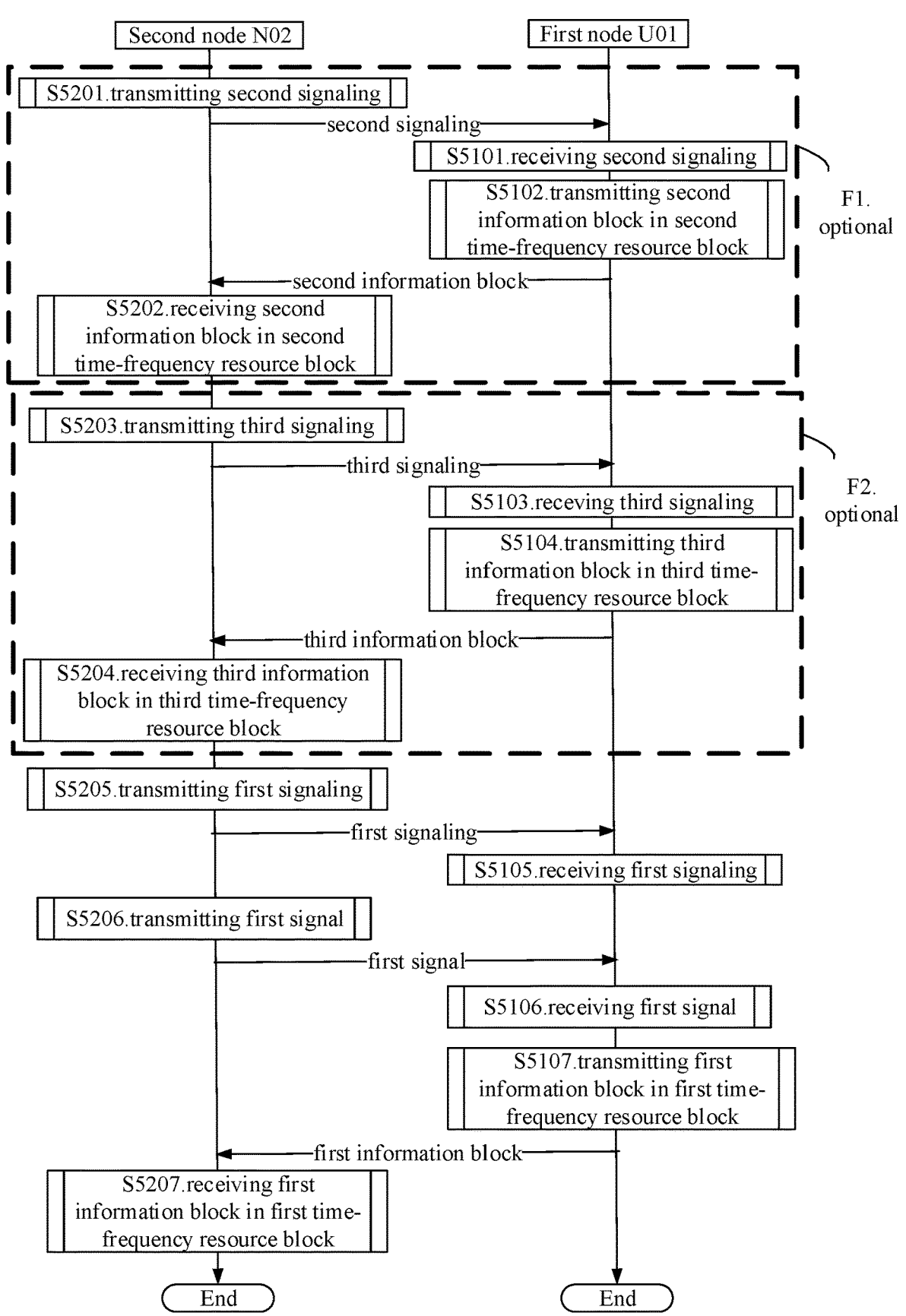
FIG. 5 illustrates a flowchart of transmission according to one embodiment of the present application.

Embodiment 5 illustrates a flowchart of wireless transmission according to one embodiment of the present application, as shown in FIG. 5. In FIG. 5, a first node U01 and a second node N02 are two communication nodes in communications via an air interface; herein, steps in the box F1 and the box F2 are optional.

The first node U01 receives a second signaling in step S5101; transmits a second information block in a second time-frequency resource block in step S5102; receives a third signaling in step S5103; transmits a third information block in a third time-frequency resource block in step S5104; receives a first signaling in step S5105; receives a first signal in step S5106; and transmits a first information block in a first time-frequency resource block in step S5107;

the second node N02 transmits a second signaling in step S5201; receives a second information block in a second time-frequency resource block in step S5202; transmits a third signaling in step S5203; receives a third information block in a third time-frequency resource block in step S5204; transmits a first signaling in step S5205; transmits a first signal in step S5206; and receives a first information block in a first time-frequency resource block in step S5207.

In Embodiment 5, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used by the first node U01 to determine whether the first TCI state group is used for monitoring at least one control channel candidate; when and only when the number of the TCI state(s) comprised in the first TCI state group is equal to 1, starting from a first time, the first TCI state group is used by the first node U01 for monitoring at least one control channel candidate, the first time-frequency resource block being used to determine the first time.

In one embodiment, a transmission of the second signaling is earlier than that of the third signaling.

In one embodiment, a transmission of the second signaling is no earlier than that of the third signaling.

In one embodiment, a transmission of the first signaling is later than that of the second signaling.

In one embodiment, a transmission of the first signaling is later than that of the third signaling.

In one embodiment, the second time-frequency resource block is earlier than the third time-frequency resource.

In one embodiment, the second time-frequency resource block is no earlier than the third time-frequency resource.

In one embodiment, the second signaling is used to indicate the second time-frequency resource block, the second information block comprising a HARQ-ACK related to the second signaling; the third signaling is used to indicate the third time-frequency resource block, the third information block comprising a HARQ-ACK related to the third signaling; the second signaling is used to indicate the second TCI state, while the third signaling is used to indicate the third TCI state; the second time-frequency resource block is used to determine the second time, while the third time-frequency resource block is used to determine the third time.

In one embodiment, the first receiver monitors the at least one control channel candidate.

In one embodiment, the first receiver monitors at least one control channel candidate in a first CORESET pool and at least one control channel candidate in a second CORESET pool; herein, at least one CORESET in the first CORESET pool does not belong to the second CORESET pool; the first CORESET pool comprises at least one CORESET, and the second CORESET pool comprises at least one CORESET.

In one embodiment, the first signaling occupies a first control channel candidate, the first control channel candidate belonging to the first CORESET pool or the second CORESET pool.

In one embodiment, the first signaling occupies a first control channel candidate, the first control channel candidate belonging to a first CORESET pool or a second CORESET pool; when the first control channel candidate belongs to the first CORESET pool, the sentence that "starting from a first time, the first TCI state group is used for monitoring at least one control channel candidate" includes a meaning that starting from a first time, the first TCI state group is used for monitoring at least one control channel candidate in the first CORESET pool; when the first control channel candidate belongs to the second CORESET pool, the sentence that "starting from a first time, the first TCI state group is used for monitoring at least one control channel candidate" includes a meaning that starting from a first time, the first TCI state group is used for monitoring at least one control channel candidate in the second CORESET pool.

In one embodiment, the first signaling occupies a first control channel candidate, the first control channel candidate belonging to a first CORESET pool or a second CORESET pool; the sentence that "starting from a first time, the first TCI state group is used for monitoring at least one control channel candidate" includes a meaning that starting from a first time, the first TCI state group is used for monitoring at least one control channel candidate in the first CORESET pool or the second CORESET pool.

In one embodiment, the first signaling occupies a first control channel candidate, the first control channel candidate belonging to a first CORESET pool or a second CORESET pool; the sentence that "starting from a first time, the first TCI state group is used for monitoring at least one control channel candidate" includes a meaning that starting from a first time, the first TCI state group is used for monitoring at least one control channel candidate comprised in "at least one of the first CORESET pool or the second CORESET pool".

In one embodiment, the first signaling occupies a first control channel candidate, the first control channel candidate being within a CORESET on a first BWP; the sentence that "starting from a first time, the first TCI state group is used for monitoring at least one control channel candidate" includes a meaning that starting from a first time, the first TCI state group is used for monitoring at least one control channel candidate in at least one CORESET on the first BWP.

In one embodiment, the first signaling occupies a first control channel candidate, the first control channel candidate being within a CORESET on a first serving cell; the sentence that "starting from a first time, the first TCI state group is used for monitoring at least one control channel candidate" includes a meaning that starting from a first time, the first TCI state group is used for monitoring at least one control channel candidate in at least one CORESET on the first serving cell.

In one embodiment, the sentence that "starting from a first time, the first TCI state group is used for monitoring at least one control channel candidate" includes a meaning that starting from a first time, the first TCI state group is used for monitoring at least one control channel candidate in at least one CORESET.

In one embodiment, the sentence that "starting from a first time, the first TCI state group is used for monitoring at least one control channel candidate" includes a meaning that starting from a first time, the first TCI state group is used for monitoring at least one control channel candidate in at least one CORESET on at least one serving cell.

In one embodiment, the sentence that "a TCI state group is used for monitoring a control channel candidate" includes a meaning that the TCI state group is used for receiving control channels on the control channel candidate.

In one embodiment, the sentence that "a TCI state group is used for monitoring a control channel candidate" includes a meaning that the TCI state group is used for determining QCL parameters of antenna ports of control channels on the control channel candidate.

In one embodiment, the sentence that "a TCI state group is used for monitoring a control channel candidate" includes a meaning that the TCI state group is used for determining QCL parameters of DeModulation Reference Signals (DMRS) ports of control channels on the control channel candidate.

In one embodiment, the sentence that "a TCI state group is used for monitoring a control channel candidate" includes a meaning that the TCI state group indicates one or more reference signals and a quasi co-location relationship mutually between antenna ports of control channels on the control channel candidate.

In one embodiment, the sentence that "a TCI state group is used for monitoring a control channel candidate" includes a meaning that the TCI state group indicates one or more reference signals and a quasi co-location relationship mutually between DMRS ports of control channels on the control channel candidate.

In one embodiment, the sentence that "a TCI state group is used for monitoring a control channel candidate" includes a meaning that antenna ports of control channels on the control channel candidate and one or more reference signals in the TCI state group are Quasi Co-Located (QCL).

In one embodiment, a Transmission configuration indication (TCI) state indicates a quasi co-location relationship.

In one embodiment, a TCI state indicates one or more reference signals.

In one embodiment, a TCI state indicates at least one reference signal.

In one embodiment, any reference signal indicated by a TCI state comprises one of a Sounding Reference Signal (SRS) resource, a Channel State Information Reference Signal (CSI-RS) resource or a Synchronization Signal/Physical Broadcast Channel (SS/PBCH) block resource.

In one embodiment, any reference signal indicated by a TCI state comprises a CSI-RS or an SS/PBCH block.

In one embodiment, a TCI state indicates at least one reference signal and Quasi-Co-Located (QCL) parameter(s) corresponding to each of the reference signal(s).

In one embodiment, a TCI state indicates at least one reference signal and type(s) of QCL parameter(s) corresponding to each of the reference signal(s).

In one embodiment, the type of QCL parameters includes TypeA, TypeB, TypeC and TypeD.

In one embodiment, the QCL parameters of TypeA include a Doppler shift, a Doppler spread, an average delay and a delay spread.

In one embodiment, the QCL parameters of TypeB include a Doppler shift and a Doppler spread.

In one embodiment, the QCL parameters of TypeC include a Doppler shift and an average delay.

In one embodiment, the QCL parameters of TypeD include a Spatial Rx parameter.

In one embodiment, for the specific definitions of the TypeA, the TypeB, the TypeC and the TypeD, refer to 3GPP TS38.214, Section 5.1.5.

In one embodiment, the QCL parameters include one or more of a delay spread, a Doppler spread, a Doppler shift, an average delay or a Spatial Rx parameter.

In one embodiment, the QCL parameters include a Doppler shift and a Doppler spread.

In one embodiment, the QCL parameters include a Doppler shift and an average delay.

In one embodiment, the QCL parameters include a Spatial Rx parameter.

In one embodiment, the QCL parameters include at least one of a Spatial Tx parameter or a Spatial Rx parameter.

In one embodiment, the QCL parameters include a Spatial Domain Receive Filter.

In one embodiment, the QCL parameters include a Spatial Domain Filter.

In one embodiment, the QCL parameters include at least one of a Spatial Domain Transmission Filter or a Spatial Domain Receive Filter.

In one embodiment, the QCL parameters of TypeA include a Doppler shift, a Doppler spread, an average delay and a delay spread.

In one embodiment, the QCL parameters of TypeB include a Doppler shift and a Doppler spread.

In one embodiment, the QCL parameters of TypeC include a Doppler shift and an average delay.

In one embodiment, the QCL parameters of TypeD include a Spatial Rx parameter.

In one embodiment, the number of the TCI state(s) comprised in the first TCI state group is used to determine a scheme for transmitting the first signal.

In one embodiment, the scheme for transmitting the first signal is one of Single Frequency Network (SFN) or Non-SFN.

In one embodiment, the scheme for transmitting the first signal is one of SFN, Space Division Multiplexing (SDM), Time Division Multiplexing (TDM), or Frequency Division Multiplexing (FDM).

In one embodiment, the scheme for transmitting the first signal is one of Single-point transmission or Multi-point transmission.

In one embodiment, a control channel on a control channel candidate is a PSCCH.

In one embodiment, a control channel on a control channel candidate is a PDCCH.

In one embodiment, a control channel candidate is a Physical Downlink Control Channel (PDCCH) Candidate, and a control channel on a control channel candidate is a PDCCH.

In one embodiment, a control channel candidate is a PSCCH Candidate, and a control channel on a control channel candidate is a PSCCH.

In one embodiment, a control channel candidate is a Monitored PDCCH Candidate.

In one embodiment, a control channel candidate occupies multiple Resource Elements (REs).

In one embodiment, a control channel candidate occupies one or multiple Control Channel Element(s) (CCE).

In one embodiment, a number of CCE(s) occupied by a control channel candidate is equal to one of 1, 2, 4, 8 or 16.

In one embodiment, a CCE comprises 9 Resource Element Groups (REGs), of which each REG comprises 4 REs.

In one embodiment, a CCE comprises 6 REGs, of which each REG comprises 12 REs.

In one embodiment, for the specific definition of the PDCCH candidate, refer to 3GPP TS 38.213, Section 10.

In one embodiment, a Control Resource Set (CORESET) comprises multiple REs.

In one embodiment, a Control Resource Set (CORESET) comprises at least one Control Channel Element (CCE).

In one embodiment, a CORESET is configured by an Information Element (IE) ControlResourceSet.

In one embodiment, for the specific definition of the CORESET, refer to 3GPP TS 38.213, Section 10.

In one embodiment, for the specific definition of the IE ControlResourceSet, refer to 3GPP TS 38.331, Section 6.3.2.

In one embodiment, a control channel candidate in a CORESET belongs to the CORESET in frequency domain.

In one embodiment, a control channel candidate in a CORESET is a control channel candidate in a search space set associated with the CORESET.

In one embodiment, a control channel candidate in a CORESET is comprised of at least one Control Channel Element (CCE) in the CORESET.

In one embodiment, any control channel candidate in a search space set associated with a CORESET is comprised of at least one CCE in the CORESET.

In one embodiment, the phrase of "a search space set associated with a CORESET" means that a CORESET is used to determine time-frequency resources occupied by a search space set associated with the CORESET in a Monitoring Occasion.

In one embodiment, the phrase of "a search space set associated with a CORESET" means that a CORESET comprises time-frequency resources occupied by a search space set associated with the CORESET in a Monitoring Occasion.

In one embodiment, the phrase of "a search space set associated with a CORESET" means that REs occupied by a CORESET comprise REs occupied by a search space set associated with the CORESET in a Monitoring Occasion.

In one embodiment, the phrase of "a search space set associated with a CORESET" means that RB(s) occupied by a CORESET in frequency domain comprises (comprise) RB(s) occupied by a search space set associated with the CORESET in frequency domain.

In one embodiment, the phrase of "a search space set associated with a CORESET" means that frequency-domain resources occupied by a CORESET comprise frequency-domain resources occupied by a search space set associated with the CORESET.

In one embodiment, the phrase of "a search space set associated with a CORESET" means that symbol(s) occupied by a CORESET is(are) used to determine symbol(s) occupied by a search space set associated with the CORESET in a Monitoring Occasion.

In one embodiment, the phrase of "a search space set associated with a CORESET" means that symbol(s) occupied by a CORESET comprises (comprise) symbol(s) occupied by a search space set associated with the CORESET in a Monitoring Occasion.

In one embodiment, the phrase of "a search space set associated with a CORESET" means that configuration information of a search space set associated with a CORESET comprises an index of the CORESET.

In one embodiment, a said Monitoring Occasion comprises a duration.

In one embodiment, a said Monitoring Occasion comprises at least one symbol.

In one embodiment, a said Monitoring Occasion comprises a slot.

In one embodiment, a said Monitoring Occasion comprises a sub-slot.

In one embodiment, a said Monitoring Occasion comprises a subframe.

In one embodiment, the sentence that "a given TCI state group is used to determine a QCL parameter of a given signal" includes a meaning that the given TCI state group is used for determining a QCL parameter of an antenna port of the given signal.

In one embodiment, the sentence that "a given TCI state group is used to determine a QCL parameter of a given signal" includes a meaning that the given TCI state group is used for determining a QCL parameter of a DeModulation Reference Signal (DMRS) port of the given signal.

In one embodiment, the sentence that "a given TCI state group is used to determine a QCL parameter of a given signal" includes a meaning that the given TCI state group indicates a quasi co-location relationship between one or more reference signals and an antenna port of the given signal.

In one embodiment, the sentence that "a given TCI state group is used to determine a QCL parameter of a given signal" includes a meaning that the given TCI state group indicates a quasi co-location relationship between one or more reference signals and a DMRS port of the given signal.

In one embodiment, the sentence that "a given TCI state group is used to determine a QCL parameter of a given signal" includes a meaning that an antenna port of the given signal and one or more reference signals in the given TCI state group are Quasi Co-Located (QCL).

In one embodiment, the sentence that "a given TCI state group is used to determine a QCL parameter of a given signal" includes a meaning that a DMRS port of the given signal and one or more reference signals in the given TCI state group are Quasi Co-Located (QCL).

In one embodiment, the sentence that "an antenna port of the given signal and one or more reference signals in the given TCI state group are QCL" includes a meaning that the first node assumes that an antenna port of the given signal and one or more reference signals in the given TCI state group are QCL.

In one embodiment, the sentence that "a DMRS port of the given signal and one or more reference signals in the given TCI state group are QCL" includes a meaning that the first node assumes that a DMRS port of the given signal and one or more reference signals in the given TCI state group are QCL.

In one embodiment, the sentence that "a given TCI state group is used to determine a QCL parameter of a given signal" includes a meaning that a same QCL parameter is used for receiving the given signal and at least one reference signal in the given TCI state group.

In one embodiment, the sentence that "a same QCL parameter is used for receiving the given signal and at least one reference signal in the given TCI state group" includes a meaning that the first node assumes that the same QCL parameter is used for receiving the given signal and at least one reference signal in the given TCI state group.

In one embodiment, the sentence that "a given TCI state group is used to determine a QCL parameter of a given signal" includes a meaning that a same QCL parameter is used for receiving the given signal and for receiving or transmitting at least one reference signal in the given TCI state group.

In one embodiment, the sentence that "a same QCL parameter is used for receiving the given signal and for receiving or transmitting at least one reference signal in the given TCI state group" includes a meaning that the first node assumes that the same QCL parameter is used for receiving the given signal and for receiving or transmitting at least one reference signal in the given TCI state group.

In one embodiment, the sentence that "a given TCI state group is used to determine a QCL parameter of a given signal" includes a meaning that a same QCL parameter is used for receiving or transmitting the given signal and for receiving or transmitting at least one reference signal in the given TCI state group.

In one embodiment, the sentence that "a same QCL parameter is used for receiving or transmitting the given signal and for receiving or transmitting at least one reference signal in the given TCI state group" includes a meaning that the first node assumes that the same QCL parameter is used for receiving or transmitting the given signal and for receiving or transmitting at least one reference signal in the given TCI state group.

In one embodiment, the given TCI state group is the first TCI state group, and the given signal is the first signal.

In one embodiment, the given TCI state group is the first TCI state group, and the given signal is a signal scheduled by the first signaling.

In one embodiment, the given TCI state group is the first TCI state group, and the given signal is a PDSCH scheduled by the first signaling.

In one embodiment, the given TCI state group is the second TCI state group, and the given signal is the first signal.

In one embodiment, the given TCI state group is the third TCI state group, and the given signal is the first signal.

In one embodiment, the given TCI state group is a TCI state, and the given signal is a PDSCH transmission occasion.

In one embodiment, the given TCI state group is the first TCI state group, and the given signal is a signal scheduled by a control signaling on the at least one control channel candidate.

In one embodiment, the given TCI state group is the first TCI state group, and the given signal is a PDSCH scheduled by a DCI signaling on the at least one control channel candidate.

In one embodiment, the given TCI state group is a TCI state in the first TCI state group, and the given signal is the first sub-signal in the first symbol group.

In one embodiment, the given TCI state group is a TCI state in the first TCI state group, and the given signal is the second sub-signal in the second symbol group.

In one embodiment, the given TCI state group is a TCI state comprised in the first TCI state group, and the given signal is the PDSCH transmission occasion.

In one embodiment, the given TCI state group is a TCI state in the first TCI state group, and the given signal is one of the two PDSCH transmission occasions.

In one embodiment, the second TCI state and the third TCI state are indicated by a higher layer signaling.

In one embodiment, the third time is the second time.

In one embodiment, the third time is different from the second time.

In one embodiment, the third time and the second time are respectively determined.

In one embodiment, the second time is later than a time for transmitting the first information block set, while the third time is later than a time for transmitting the first information block set.

In one embodiment, the second time is later than a time for transmitting the first information block set, the third time being the second time.

In one embodiment, the second time is a start time when "the second TCI state is used for monitoring at least one control channel candidate in the first CORESET pool" becomes effective, while the third time is a start time when "the third TCI state is used for monitoring at least one control channel candidate in the second CORESET pool" becomes effective.

In one embodiment, the first receiver transmits a HARQ-ACK for a PDSCH bearing the first information block set in a fourth time-frequency resource block.

In one embodiment, the fourth time-frequency resource block is a PUCCH resource.

In one embodiment, the fourth time-frequency resource block comprises at least one RE.

In one embodiment, the second time is later than an end time of the fourth time-frequency resource block, the third time being the second time.

In one embodiment, the second time is a start time of a first slot following at least a fourth interval value after a last symbol of the fourth time-frequency resource block, the third time being the second time.

In one embodiment, the second time is a start time of a first slot following at least a fourth interval value after a slot to which the fourth time-frequency resource block belongs in time domain, the third time being the second time.

In one embodiment, the fourth interval value is measured in slot(s).

In one embodiment, the fourth interval value is measured in symbol(s).

In one embodiment, the fourth interval value is measured in millisecond(s) (ms).

In one embodiment, the fourth interval value is a positive integer.

In one embodiment, the fourth interval value is a positive real number.

In one embodiment, the fourth interval value is fixed.

In one embodiment, the fourth interval value is configured by a higher layer parameter.

In one embodiment, a control channel candidate occupied by the second signaling is in the first CORESET pool, while a control channel candidate occupied by the third signaling is in the second CORESET pool.

In one embodiment, the second signaling is a higher layer signaling.

In one embodiment, the third signaling is a higher layer signaling.

In one embodiment, the second signaling is a physical layer signaling, and the third signaling is a physical layer signaling.

In one embodiment, the second signaling is a Downlink Control Information (DCI) signaling, while the third signaling is a DCI signaling.

In one embodiment, the second signaling is a Sidelink Control Information (SCI) signaling, while the third signaling is an SCI signaling.

In one embodiment, the second signaling is used for scheduling a PDSCH.

In one embodiment, the third signaling is used for scheduling a PDSCH.

In one embodiment, the second signaling is used for scheduling a PSSCH.

In one embodiment, the third signaling is used for scheduling a PSSCH.

In one embodiment, the second signaling is used for scheduling a PDSCH or a reference signal.

In one embodiment, the third signaling is used for scheduling a PDSCH or a reference signal.

In one embodiment, the reference signal comprises at least one of an SRS or a CSI-RS.

In one embodiment, the second time-frequency resource block comprises a PUCCH resource, while the third time-frequency resource block comprises a PUCCH resource.

In one embodiment, the second time-frequency resource block comprises a PSFCH resource, while the third time-frequency resource block comprises a PSFCH resource.

In one embodiment, the second information block comprises Uplink Control Information (UCI), while the third information block comprises UCI.

In one embodiment, the second information block comprises control information, while the third information block comprises control information.

In one embodiment, the second time-frequency resource block comprises at least one RE, while the third time-frequency resource block comprises at least one RE.

In one embodiment, the second signaling comprises a second field, the second field in the second signaling being used to indicate the second time-frequency resource block; the second field comprises at least one bit.

In one embodiment, the third signaling comprises a second field, the second field in the third signaling being used to indicate the third time-frequency resource block; the second field comprises at least one bit.

In one embodiment, the HARQ-ACK related to the second signaling comprises a HARQ-ACK for the second signaling or a HARQ-ACK for a signal scheduled by the second signaling; the HARQ-ACK related to the third signaling comprises a HARQ-ACK for the third signaling or a HARQ-ACK for a signal scheduled by the third signaling.

In one embodiment, the HARQ-ACK related to the second signaling comprises a HARQ-ACK for the second signaling or a HARQ-ACK for a PDSCH scheduled by the second signaling; the HARQ-ACK related to the third signaling comprises a HARQ-ACK for the third signaling or a HARQ-ACK for a PDSCH scheduled by the third signaling.

In one embodiment, when the second signaling does not comprise a downlink assignment, the HARQ-ACK related to the second signaling comprises a HARQ-ACK for the second signaling.

In one embodiment, when the third signaling does not comprise a downlink assignment, the HARQ-ACK related to the third signaling comprises a HARQ-ACK for the third signaling.

In one embodiment, the HARQ-ACK related to the second signaling is an ACK, while the HARQ-ACK related to the third signaling is an ACK.

In one embodiment, the HARQ-ACK related to the second signaling is an ACK or a NACK, while the HARQ-ACK related to the third signaling is an ACK or a NACK.

In one embodiment, the second signaling comprises a first field, the first field in the second signaling being used to indicate a second TCI state; the first field comprising at least one bit.

In one embodiment, the third signaling comprises a first field, the first field in the third signaling being used to indicate a third TCI state; the first field comprising at least one bit.

In one embodiment, the second signaling comprises a first field, and a value of the first field in the second signaling is one of the N1 codepoint(s), a TCI state group of the N1 TCI state group(s) that corresponds to the value of the first field in the second signaling only comprises one TCI state, where the second TCI state is a TCI state group of the N1 TCI state group(s) that corresponds to the value of the first field in the second signaling.

In one embodiment, the second signaling comprises a first field, and a value of the first field in the second signaling is one of the N1 codepoint(s), and the second TCI state belongs to a TCI state group of the N1 TCI state group(s) that corresponds to the value of the first field in the second signaling.

In one embodiment, the third signaling comprises a first field, and a value of the first field in the third signaling is one of the N1 codepoint(s), a TCI state group of the N1 TCI state group(s) that corresponds to the value of the first field in the third signaling only comprises one TCI state, where the third TCI state is a TCI state group of the N1 TCI state group(s) that corresponds to the value of the first field in the third signaling.

In one embodiment, the third signaling comprises a first field, and a value of the first field in the third signaling is one of the N1 codepoint(s), and the third TCI state belongs to a TCI state group of the N1 TCI state group(s) that corresponds to the value of the first field in the third signaling.

In one embodiment, the sentence that "the first time-frequency resource block is used to determine the first time" includes a meaning that the first time is a start time of a first slot following at least a first interval value after a last symbol in the first time-frequency resource block; the sentence that "the second time-frequency resource block is used to determine the second time" includes a meaning that the second time is a start time of a first slot following at least the first interval value after a last symbol in the second time-frequency resource block; the sentence that "the third time-frequency resource block is used to determine the third time" includes a meaning that the third time is a start time of a first slot following at least the first interval value after a last symbol in the third time-frequency resource block.

In one embodiment, the sentence that "the second time-frequency resource block is used to determine the second time" includes a meaning that the second time is a start time of a first slot following at least a second interval value after a last symbol in the second time-frequency resource block.

In one embodiment, the sentence that "the second time-frequency resource block is used to determine the second time" includes a meaning that the second time is a start time of a first slot following at least a second interval value after a slot to which the second time-frequency resource block belongs in time domain.

In one embodiment, the sentence that "the second time-frequency resource block is used to determine the second time" includes a meaning that the second time is a start time of a first slot following at least a second interval value after a first symbol in the second time-frequency resource block.

In one embodiment, the sentence that "the second time-frequency resource block is used to determine the second time" includes a meaning that the second time is a start time of a first time unit following at least a second interval value after an end time of the second time-frequency resource block.

In one embodiment, the sentence that "the second time-frequency resource block is used to determine the second time" includes a meaning that the second time is a start time of a first time unit following at least a second interval value after a start time of the second time-frequency resource block.

In one embodiment, the second interval value is the first interval value.

In one embodiment, the second interval value is different from the first interval value.

In one embodiment, the second interval value is measured in the time unit.

In one embodiment, the second interval value is measured in slot(s).

In one embodiment, the second interval value is measured in symbol(s).

In one embodiment, the second interval value is measured in millisecond(s) (ms).

In one embodiment, the second interval value is a positive integer.

In one embodiment, the second interval value is a positive real number.

In one embodiment, the second interval value is fixed.

In one embodiment, the second interval value is configured by a higher layer parameter.

In one embodiment, the second interval value is BeamAppTime_r17.

In one embodiment, the second interval value is configured by a higher layer parameter beamAppTime-r17.

In one embodiment, the sentence that "the third time-frequency resource block is used to determine the third time" includes a meaning that the third time is a start time of a first slot following at least a third interval value after a last symbol in the third time-frequency resource block.

In one embodiment, the sentence that "the third time-frequency resource block is used to determine the third time" includes a meaning that the third time is a start time of a first slot following at least a third interval value after a slot to which the third time-frequency resource block belongs in time domain.

In one embodiment, the sentence that "the third time-frequency resource block is used to determine the third time" includes a meaning that the third time is a start time of a first slot following at least a third interval value after a first symbol in the third time-frequency resource block.

In one embodiment, the sentence that "the third time-frequency resource block is used to determine the third time" includes a meaning that the third time is a start time of a first time unit following at least a third interval value after an end time of the third time-frequency resource block.

In one embodiment, the sentence that "the third time-frequency resource block is used to determine the third time" includes a meaning that the third time is a start time of a first time unit following at least a third interval value after a start time of the third time-frequency resource block.

In one embodiment, the third interval value is different from the first interval value.

In one embodiment, the third interval value is measured in the time unit.

In one embodiment, the third interval value is measured in slot(s).

In one embodiment, the third interval value is measured in symbol(s).

In one embodiment, the third interval value is measured in millisecond(s) (ms).

In one embodiment, the third interval value is a positive integer.

In one embodiment, the third interval value is a positive real number.

In one embodiment, the third interval value is fixed.

In one embodiment, the third interval value is configured by a higher layer parameter.

In one embodiment, the third interval value is BeamApp-Time_r17.

In one embodiment, the third interval value is configured by a higher layer parameter beamAppTime-r17.

Embodiment 6

Embodiment 6 illustrates a schematic diagram of a relation between a first TCI state group and a first signal according to one embodiment of the present application, as shown in FIG. 6.

In Embodiment 6, the first signaling indicates a first symbol group; the number of the TCI state(s) comprised in the first TCI state group and the first symbol group are both used to determine time-domain resources occupied by the first signal; when the number of the TCI state(s) comprised in the first TCI state group is equal to 1, the time-domain resources occupied by the first signal comprise the first symbol group; when the number of the TCI state(s) comprised in the first TCI state group is equal to 2, the time-domain resources occupied by the first signal comprise the first symbol group and a second symbol group; the first symbol group and the second symbol group are mutually orthogonal in time domain, where a number of symbol(s) comprised in the second symbol group is equal to a number of symbol(s) comprised in the first symbol group.

In one embodiment, the first signaling indicates a first symbol group; the number of the TCI state(s) comprised in the first TCI state group and the first symbol group are both used to determine time-domain resources occupied by the first signal; when the number of the TCI state(s) comprised in the first TCI state group is equal to 1, the time-domain resources occupied by the first signal comprise the first symbol group; when the number of the TCI state(s) comprised in the first TCI state group is equal to 2, the time-domain resources occupied by the first signal comprise partial or all symbols in the first symbol group and partial or all symbols in a second symbol group; the first symbol group and the second symbol group are mutually orthogonal in time domain, where a number of symbol(s) comprised in the second symbol group is equal to a number of symbol(s) comprised in the first symbol group.

In one embodiment, the first symbol group comprises at least one symbol.

In one embodiment, the first symbol group comprises only one symbol.

In one embodiment, the first symbol group comprises multiple symbols.

In one embodiment, the first symbol group comprises multiple consecutive symbols.

In one embodiment, each symbol in the first symbol group belongs to a same slot.

In one embodiment, the first signaling comprises a third field, and the third field in the first signaling indicates the first symbol group; the third field comprises at least one bit.

In one subembodiment, each symbol in the first symbol group belongs to a first slot, the third field in the first signaling indicating the first slot.

In one subembodiment, each symbol in the first symbol group belongs to a first slot, the third field in the first signaling indicating a position of a starting symbol in the first symbol group within the first slot.

In one subembodiment, the third field in the first signaling indicates a number of symbol(s) comprised in the first symbol group.

In one subembodiment, the third field in the first signaling indicates a number of consecutive symbols comprised in the first symbol group.

In one embodiment, the third field is a Time domain resource assignment field.

In one embodiment, the time-domain resources occupied by the first signal comprise the first symbol group.

In one embodiment, the time-domain resources occupied by the first signal comprise partial or all symbols in the first symbol group.

In one embodiment, the time-domain resources occupied by the first signal comprise the first symbol group, or, the time-domain resources occupied by the first signal comprise the first symbol group and symbol(s) other than the first symbol group.

In one embodiment, the time-domain resources occupied by the first signal comprise partial or all symbols in the first symbol group, or, the time-domain resources occupied by the first signal comprise partial or all symbols in the first symbol group and symbol(s) other than the first symbol group.

In one embodiment, the first symbol group and the second symbol group belong to a same slot.

In one embodiment, when the number of the TCI state(s) comprised in the first TCI state group is equal to 1, the time-domain resources occupied by the first signal is the first symbol group; when the number of the TCI state(s) comprised in the first TCI state group is equal to 2, the time-domain resources occupied by the first signal are the first symbol group and the second symbol group.

In one embodiment, when the number of the TCI state(s) comprised in the first TCI state group is equal to 1, time-domain resources occupied by the first signal in a slot is the first symbol group; when the number of the TCI state(s) comprised in the first TCI state group is equal to 2, time-domain resources occupied by the first signal in a slot are the first symbol group and the second symbol group.

In one embodiment, when the number of the TCI state(s) comprised in the first TCI state group is equal to 1, the time-domain resources occupied by the first signal do not comprise the second symbol group.

In one embodiment, when the number of the TCI state(s) comprised in the first TCI state group is equal to 2, a TCI state comprised in the first TCI state group is used to determine a QCL parameter of a first sub-signal in the first symbol group, while another TCI state comprised in the first TCI state group is used to determine a QCL parameter of a second sub-signal in the second symbol group, the first signal comprising the first sub-signal and the second sub-signal.

In one embodiment, the second symbol group comprises at least one symbol.

In one embodiment, the first symbol group comprises only one symbol, and the second symbol group comprises only one symbol.

In one embodiment, the first symbol group comprises multiple symbols, and the second symbol group comprises multiple symbols.

In one embodiment, the first symbol group comprises multiple consecutive symbols, and the second symbol group comprises multiple consecutive symbols.

In one embodiment, each symbol in the second symbol group belongs to a same slot.

In one embodiment, the first symbol group and the second symbol group belong to a same slot.

In one embodiment, a first symbol in the second symbol group is later than a last symbol in the first symbol group in time domain.

In one embodiment, the first symbol group and the second symbol group both belong to the first slot.

In one embodiment, a first symbol in the second symbol group starts following B1 symbol(s) following a last symbol in the first symbol group, where B1 is a non-negative integer; the B1 is equal to 0, or the B1 is configured by a higher layer parameter.

In one subembodiment, names of the higher-layer parameter for configuring the B1 include StartingSymbolOffsetK.

In one subembodiment, a first symbol in the second symbol group and a last symbol in the first symbol group are spaced by the B1 symbol(s).

In one embodiment, when the number of the TCI state(s) comprised in the first TCI state group is equal to 1, the first signal only corresponds to a PDSCH transmission occasion, the first TCI state group being used to determine a QCL parameter of the PDSCH transmission occasion; when the number of the TCI state(s) comprised in the first TCI state group is equal to 2, the first signal corresponds to two PDSCH transmission occasions, and two TCI states comprised in the first TCI state group are respectively used to determine QCL parameters of the two PDSCH transmission occasions.

In one subembodiment, the PDSCH transmission occasion occupies the first symbol group; the two PDSCH transmission occasions respectively occupy the first symbol group and the second symbol group.

In one subembodiment, the two PDSCH transmission occasions belong to a same slot.

In one subembodiment, the two PDSCH transmission occasions both belong to the first slot.

In one subembodiment, time-domain resources occupied by the two PDSCH transmission occasions are mutually orthogonal.

In one subembodiment, numbers of symbols occupied by the two PDSCH transmission occasions are equal.

In one subembodiment, a first symbol of a second PDSCH transmission occasion between the two PDSCH transmission occasions starts following B1 symbol(s) after a last symbol of a first PDSCH transmission occasion between the two PDSCH transmission occasions, where B1 is a non-negative integer; the B1 is equal to 0, or the B1 is configured by a higher layer parameter.

In one reference embodiment of the above subembodiment, names of the higher-layer parameter for configuring the B1 include StartingSymbolOffsetK.

In one reference embodiment of the above subembodiment, a first symbol of a second PDSCH transmission occasion between the two PDSCH transmission occasions and a last symbol of a first PDSCH transmission occasion between the two PDSCH transmission occasions are spaced by the B1 symbol(s).

Embodiment 7

Embodiment 7 illustrates a schematic diagram of a QCL parameter of a first signal according to one embodiment of the present application; as shown in FIG. 7.

In Embodiment 7, when the number of the TCI state(s) comprised in the first TCI state group is greater than 1, the first TCI state group is used to determine a QCL parameter of the first signal.

In one embodiment, when the number of the TCI state(s) comprised in the first TCI state group is equal to 1, a TCI state group used to determine a QCL parameter of the first signal is indicated by a signaling other than the first signaling.

In one embodiment, when the number of the TCI state(s) comprised in the first TCI state group is equal to 1, a TCI state group used to determine a QCL parameter of the first signal is indicated by a signaling earlier than the first signaling.

In one embodiment, whether the first TCI state group is used to determine a QCL parameter of the first signal is related to the number of the TCI state(s) comprised in the first TCI state group.

In one embodiment, when the number of the TCI state(s) comprised in the first TCI state group is greater than 1, the first TCI state group is used to determine a QCL parameter of the first signal, the first signaling being used to indicate the first TCI state group.

In one embodiment, starting from a second time, a second TCI state is used for monitoring at least one control channel candidate in a first CORESET pool; starting from a third time, a third TCI state is used for monitoring at least one control channel candidate in a second CORESET pool; the first signaling occupies a first control channel candidate, the first control channel candidate belonging to the at least one control channel candidate in the first CORESET pool or the at least one control channel candidate in the second CORE-SET pool; at least one CORESET in the first CORESET pool does not belong to the second CORESET pool; the first CORESET pool comprises at least one CORESET, and the second CORESET pool comprises at least one CORESET; when the number of the TCI state(s) comprised in the first TCI state group is greater than 1, the first TCI state group is used to determine a QCL parameter of the first signal, the first TCI state group comprising the second TCI state and the third TCI state.

Embodiment 8

Embodiment 8 illustrates a schematic diagram of a relation between a second TCI state and a first CORESET pool, and a relation between a third TCI state and a second CORESET pool according to one embodiment of the present application; as shown in FIG. 8.

In Embodiment 8, starting from a second time, a second TCI state is used for monitoring at least one control channel candidate in a first CORESET pool; starting from a third time, a third TCI state is used for monitoring at least one control channel candidate in a second CORESET pool; the first signaling occupies a first control channel candidate, the first control channel candidate belonging to the at least one control channel candidate in the first CORESET pool or the at least one control channel candidate in the second CORE-SET pool; at least one CORESET in the first CORESET pool does not belong to the second CORESET pool; the first CORESET pool comprises at least one CORESET, and the second CORESET pool comprises at least one CORESET.

In one embodiment, the second time is earlier than a start time of the first signaling, while the third time is earlier than the start time of the first signaling.

In one embodiment, the second time is earlier than the first time, while the third time is earlier than the first time.

In one embodiment, each of start time(s) of the at least one control channel candidate in the first CORESET pool is no earlier than the second time, while each of start time(s) of the at least one control channel candidate in the second CORE-SET pool is no earlier than the third time.

In one embodiment, the first node comprises: the first receiver, which receives a first information block set; where the first information block set is used to determine the first CORESET pool and the second CORESET pool.

In one embodiment, the first information block set is borne by a physical layer signaling.

In one embodiment, the higher-layer signaling comprises a Radio Resource Control (RRC) signaling.

In one embodiment, the higher-layer signaling comprises a MAC CE signaling.

In one embodiment, the first information block set comprises at least one Information Element (IE).

In one embodiment, the first information block set is used to indicate at least one Control Resource Set (CORESET) comprised in the first CORESET pool and at least one CORESET comprised in the second CORESET pool.

In one embodiment, the first information block set is used to indicate multiple CORESETs and each of indexes of CORESET pools to which each of the CORESETs respectively belongs, where the CORESET pool to which one CORESET belongs is the first CORESET pool or the second CORESET pool.

In one embodiment, the first information block set is used to indicate multiple CORESETs and whether each of the CORESETs belongs to the first CORESET pool or the second CORESET pool.

In one embodiment, the first information block set comprises multiple information blocks, and any information block in the first information block set indicates a CORE-SET and an index of a CORESET pool to which the CORESET belongs, where the CORESET pool to which the CORESET belongs is the first CORESET pool or the second CORESET pool.

In one embodiment, the first information block set comprises multiple information blocks, and any information block in the first information block set indicates a CORE-SET and whether the CORESET belongs to the first CORE-SET pool or the second CORESET pool.

In one embodiment, the first information block set comprises multiple information blocks, and any information block in the first information block set comprises an IE ControlResourceSet.

In one embodiment, the first information block set comprises multiple IEs ControlResourceSet.

In one embodiment, an index of the first CORESET pool is different from an index of the second CORESET pool.

In one embodiment, an index of the first CORESET pool and an index of the second CORESET pool are 0 and 1, respectively; or, an index of the first CORESET pool and an index of the second CORESET pool are 1 and 0, respectively.

In one embodiment, the first CORESET pool and the second CORESET pool belong to a same Band Width Part (BWP).

In one embodiment, the first CORESET pool and the second CORESET pool belong to a same serving cell.

In one embodiment, the first CORESET pool and the second CORESET pool belong to a same carrier.

Embodiment 9

Embodiment 9 illustrates a schematic diagram of a QCL parameter of a first signal according to another embodiment of the present application; as shown in FIG. 9.

In Embodiment 9, when the number of the TCI state(s) comprised in the first TCI state group is equal to 1, and the first control channel candidate belongs to the at least one control channel candidate in the first CORESET pool, the second TCI state is used to determine a QCL parameter of the first signal; when the number of the TCI state(s) comprised in the first TCI state group is equal to 1, and the first control channel candidate belongs to the at least one control channel candidate in the second CORESET pool, the third TCI state is used to determine a QCL parameter of the first signal.

In one embodiment, at least one of the second TCI state or the third TCI state is used to determine a QCL parameter of the first signal.

In one embodiment, when the number of the TCI state(s) comprised in the first TCI state group is equal to 1, the second TCI state or the third TCI state is used to determine a QCL parameter of the first signal.

Embodiment 10

Embodiment 10 illustrates a schematic diagram of a first signaling used to determine a first TCI state group according to one embodiment of the present application, as shown in FIG. 10.

In Embodiment 10, when the number of the TCI state(s) comprised in the first TCI state group is greater than 1, the first TCI state group comprises the second TCI state and the third TCI state.

In one embodiment, when the number of the TCI state(s) comprised in the first TCI state group is greater than 1, the first TCI state group is used to determine a QCL parameter of the first signal, the first TCI state group comprising the second TCI state and the third TCI state.

In one embodiment, when the number of the TCI state(s) comprised in the first TCI state group is greater than 1, the first TCI state group is used to determine a QCL parameter of the first signal.

Embodiment 11

Embodiment 11 illustrates a structure block diagram of a processing device used in a first node according to one embodiment of the present application; as shown in FIG. 11. In FIG. 11, a processing device 1200 in the first node comprises at least the first receiver 1201 of a first receiver 1201 or a first transmitter 1202, where the first transmitter 1202 is optional.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

The first receiver 1201 receives a first signaling; and receives a first signal; and the first transmitter 1202 transmits a first information
　　block in a first time-frequency resource block.

In Embodiment 11, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the first signaling indicates a first symbol group; the number of the TCI state(s) comprised in the first TCI state group and the first symbol group are both used to determine time-domain resources occupied by the first signal; when the number of the TCI state(s) comprised in the first TCI state group is equal to 1, the time-domain resources occupied by the first signal comprise the first symbol group; when the number of the TCI state(s) comprised in the first TCI state group is equal to 2, the time-domain resources occupied by the first signal comprise the first symbol group and a second symbol group; the first symbol group and the second symbol group are mutually orthogonal in time domain, where a number of symbol(s) comprised in the second symbol group is equal to a number of symbol(s) comprised in the first symbol group.

In one embodiment, when the number of the TCI state(s) comprised in the first TCI state group is greater than 1, the first TCI state group is used to determine a QCL parameter of the first signal.

In one embodiment, starting from a second time, a second TCI state is used for monitoring at least one control channel candidate in a first CORESET pool; starting from a third time, a third TCI state is used for monitoring at least one control channel candidate in a second CORESET pool; the first signaling occupies a first control channel candidate, the first control channel candidate belonging to the at least one control channel candidate in the first CORESET pool or the at least one control channel candidate in the second CORESET pool; at least one CORESET in the first CORESET pool does not belong to the second CORESET pool; the first CORESET pool comprises at least one CORESET, and the second CORESET pool comprises at least one CORESET.

In one embodiment, the first receiver 1201 receives a second signaling and a third signaling; the first transmitter 1202 transmits a second information block in a second time-frequency resource block and a third information block in a third time-frequency resource block; where the second signaling is used to indicate the second time-frequency resource block, the second information block comprising a HARQ-ACK related to the second signaling; the third signaling is used to indicate the third time-frequency resource block, the third information block comprising a HARQ-ACK related to the third signaling; the second signaling is used to indicate the second TCI state, while the third signaling is used to indicate the third TCI state; the second time-frequency resource block is used to determine the second time, while the third time-frequency resource block is used to determine the third time.

In one embodiment, when the number of the TCI state(s) comprised in the first TCI state group is equal to 1, and the first control channel candidate belongs to the at least one control channel candidate in the first CORESET pool, the second TCI state is used to determine a QCL parameter of the first signal; when the number of the TCI state(s) comprised in the first TCI state group is equal to 1, and the first control channel candidate belongs to the at least one control channel candidate in the second CORESET pool, the third TCI state is used to determine a QCL parameter of the first signal.

In one embodiment, when the number of the TCI state(s) comprised in the first TCI state group is greater than 1, and the first TCI state group comprises the second TCI state and the third TCI state.

Embodiment 12

Embodiment 12 illustrates a structure block diagram of a processing device used in a second node according to one embodiment of the present application; as shown in FIG. 12. In FIG. 12, a processing device 1300 in a second node comprises at least the second transmitter 1301 of a second transmitter 1301 or a second receiver 1302, where the second receiver 1302 is optional.

In one embodiment, the second node is a base station.

In one embodiment, the second node is a UE.

In one embodiment, the second node is a relay node.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

The second transmitter 1301 transmits a first signaling; and transmits a first signal; and the second receiver 1302 receives a first information block in a first time-frequency resource block.

In Embodiment 12, the first signaling is used for scheduling the first signal, and the first signaling is used for indicating the first time-frequency resource block, the first information block comprising a HARQ-ACK for the first signal; the first signaling is used to determine a first TCI state group, the first TCI group comprising one or multiple TCI states; a number of the TCI state(s) comprised in the first TCI state group is used to determine whether the first TCI state group is used for monitoring at least one control channel candidate; when and only when the number of the TCI state(s) comprised in the first TCI state group is equal to 1, starting from a first time, the first TCI state group is used for monitoring at least one control channel candidate, the first time-frequency resource block being used to determine the first time.

In one embodiment, the first signaling indicates a first symbol group; the number of the TCI state(s) comprised in the first TCI state group and the first symbol group are both used to determine time-domain resources occupied by the first signal; when the number of the TCI state(s) comprised in the first TCI state group is equal to 1, the time-domain resources occupied by the first signal comprise the first symbol group; when the number of the TCI state(s) comprised in the first TCI state group is equal to 2, the time-domain resources occupied by the first signal comprise the first symbol group and a second symbol group; the first symbol group and the second symbol group are mutually orthogonal in time domain, where a number of symbol(s) comprised in the second symbol group is equal to a number of symbol(s) comprised in the first symbol group.

In one embodiment, when the number of the TCI state(s) comprised in the first TCI state group is greater than 1, the first TCI state group is used to determine a QCL parameter of the first signal.

In one embodiment, starting from a second time, a second TCI state is used for monitoring at least one control channel candidate in a first CORESET pool; starting from a third time, a third TCI state is used for monitoring at least one control channel candidate in a second CORESET pool; the first signaling occupies a first control channel candidate, the first control channel candidate belonging to the at least one control channel candidate in the first CORESET pool or the at least one control channel candidate in the second CORESET pool; at least one CORESET in the first CORESET pool does not belong to the second CORESET pool; the first CORESET pool comprises at least one CORESET, and the second CORESET pool comprises at least one CORESET.

In one embodiment, the second transmitter 1301 transmits a second signaling and a third signaling; the second receiver 1302 receives a second information block in a second time-frequency resource block and a third information block in a third time-frequency resource block; where the second signaling is used to indicate the second time-frequency resource block, the second information block comprising a HARQ-ACK related to the second signaling; the third signaling is used to indicate the third time-frequency resource block, the third information block comprising a HARQ-ACK related to the third signaling; the second signaling is used to indicate the second TCI state, while the third signaling is used to indicate the third TCI state; the second time-frequency resource block is used to determine the second time, while the third time-frequency resource block is used to determine the third time.

In one embodiment, when the number of the TCI state(s) comprised in the first TCI state group is equal to 1, and the first control channel candidate belongs to the at least one control channel candidate in the first CORESET pool, the second TCI state is used to determine a QCL parameter of the first signal; when the number of the TCI state(s) comprised in the first TCI state group is equal to 1, and the first control channel candidate belongs to the at least one control channel candidate in the second CORESET pool, the third TCI state is used to determine a QCL parameter of the first signal.

In one embodiment, when the number of the TCI state(s) comprised in the first TCI state group is greater than 1, and the first TCI state group comprises the second TCI state and the third TCI state.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any change or revision made based on embodiments described herein, if, by which partial or all of similar technical effects can be achieved, shall be deemed as apparent and covered within the scope of protection of the present application.

What is claimed is:

1. A user equipment (UE), comprising:
a receiver configured to:
  receive first control information that schedules a downlink channel transmission and that indicates a first time-frequency resource, and
  receive the downlink channel transmission; and
a transmitter configured to transmit first HARQ-ACK information for the downlink channel transmission in the first time-frequency resource,
wherein a first TCI state group is based on the first control information,
wherein the UE is configured to, on a condition that a number of TCI states in the first TCI state group one, monitor a control channel candidate from a first time slot using the first TCI state group, and wherein the first time slot is based on the first time-frequency resource, and
wherein the UE is configured to receive the first control information on at least one first control channel candidate in a first CORESET pool or at least one second control channel candidate in a second CORESET pool, wherein the UE is configured to monitor the at least one first control channel candidate from a second slot using a second TCI state and monitor the at least one second control channel candidate from a third slot using a third TCI state.

2. The UE according to claim 1, wherein the first control information indicates a first symbol group, time-domain resources occupied by the downlink channel transmission are based on the number of the TCI states of the first TCI state group and the first symbol group, on a condition that the number of the TCI states of the first TCI state group is one, the time-domain resources occupied by the downlink channel transmission include the first symbol group, on a condition that the number of the TCI states of the first TCI state group is two, the time-domain resources occupied by the downlink channel transmission include the first symbol group and a second symbol group, and a second number of symbols of the second symbol group is equal to a first number of symbols of the first symbol group.

3. The UE according to claim 1, wherein on a condition that the number of the TCI states of the first TCI state group is greater than one, a QCL parameter of the downlink channel transmission is based on the first TCI state group.

4. The UE according to claim 1, wherein:
at least one CORESET is in the first CORESET pool and not in the second CORESET pool.

5. The UE according to claim 4, wherein;
the receiver is configured to receive second control information and third control information; the transmitter is configured to transmit second HARQ-ACK information in a second time-frequency resource and third HARQ-ACK information in a third time-frequency resource, the second control information indicates the second time-frequency resource, the second HARQ-ACK information is related to the second control information, the third control information indicates the third time-frequency resource, the third HARQ-ACK information is related to the third control information, the second control information indicates the second TCI state, the third control information indicates the third TCI state, the second slot is based on the second time-frequency resource, and the third slot is based on the third time-frequency resource, or
on a condition that the number of the TCI states in the first TCI state group is one and the first control information is received on the at least one first control channel candidate in the first CORESET pool, a QCL parameter of the downlink channel transmission is based on the second TCI state, and on a condition that the number of the TCI states in the first TCI state group is one and the first control information is received on the at least one second control channel candidate in the second CORESET pool, the QCL parameter of the downlink channel transmission is based on the third TCI state,
on a condition that the number of the TCI states of the first TCI state group is greater than one, the first TCI state group includes the second TCI state and the third TCI state.

6. A base station, comprising:
a transmitter configured to:
  transmit first control information that schedules a downlink channel transmission and that indicates a first time-frequency resource, and
  transmit the downlink channel transmission; and
a receiver configured to receive first HARQ-ACK information for the downlink channel transmission in the first time-frequency resource,
wherein a first TCI state group is based on the first control information,
wherein on a condition that a number of TCI states in the first TCI state group is one, a control channel candidate is monitored from a first time slot using the first TCI state group, and wherein the first time slot is based on the first time-frequency resource, and
wherein the first control information is transmitted on at least one first control channel candidate in a first CORESET pool or at least one second control channel candidate in a second CORESET pool, wherein the at least one first control channel candidate is monitored from a second slot using a second TCI state and the at least one second control channel candidate is monitored from a third slot using a third TCI state.

7. The base station according to claim 6, wherein the first control information indicates a first symbol group, time-domain resources occupied by the downlink channel transmission are based on the number of the TCI states of the first TCI state group and the first symbol group, on a condition that the number of the TCI states of the first TCI state group is one, the time-domain resources occupied by the downlink channel transmission include the first symbol group, on a condition that the number of the TCI states of the first TCI state group is two, the time-domain resources occupied by the downlink channel transmission include the first symbol group and a second symbol group, and a second number of symbols of the second symbol group is equal to a first number of symbols of the first symbol group.

8. The base station according to claim 6, wherein on a condition that the number of the TCI states of the first TCI state group is greater than one, a QCL parameter of the downlink channel transmission is based on the first TCI state group.

9. The base station according to claim 6, wherein at least one CORESET is in the first CORESET pool and not in the second CORESET pool.

10. The base station according to claim 9, wherein:

the transmitter is configured to transmit second control information and third control information; the receiver is configured to receive second HARQ-ACK information in a second time-frequency resource and third HARQ-ACK information in a third time-frequency resource, the second control information indicates the second time-frequency resource, the second HARQ-ACK information is related to the second control information, the third control information indicates the third time-frequency resource, the third HARQ-ACK information is related to the third control information, the second control information indicates the second TCI state, the third control information indicates the third TCI state, the second slot is based on the second time-frequency resource, and the third slot is based on the third time-frequency resource, or on a condition that the number of the TCI states in the first TCI state group is one and the first control information is transmitted on the at least one first control channel candidate in the first CORESET pool, a QCL parameter of the downlink channel transmission is based on the second TCI state, and on a condition that the number of the TCI states in the first TCI state group is one and the first control information is transmitted on the at least one second control channel candidate in the second CORESET pool, the QCL parameter of the downlink channel transmission is based on the third TCI state, or on a condition that the number of the TCI states of the first TCI state group is greater than one, the first TCI state group includes the second TCI state and the third TCI state.

11. A method, comprising:

receiving first control information that schedules a downlink channel transmission and that indicates a first time-frequency resource;

receiving the downlink channel transmission;

transmitting first HARQ-ACK information for the downlink channel transmission in the first time-frequency resource, wherein a first TCI state group is based on the first control information; and on a condition that a number of TCI states in the first TCI state group is one, monitoring a control channel candidate from a first time slot using the first TCI state group, wherein the first time slot is based on the first time-frequency resource, wherein the first control information is received on at least one first control channel candidate in a first CORESET pool or at least one second control channel candidate in a second CORESET pool, wherein the at least one first control channel candidate is monitored from a second slot using a second TCI state and the at least one second control channel candidate is monitored from a third slot using a third TCI state.

12. The method according to claim 11, wherein the first control information indicates a first symbol group, time-domain resources occupied by the downlink channel transmission are based on the number of the TCI states of the first TCI state group and the first symbol group, on a condition that the number of the TCI states of the first TCI state group is one, the time-domain resources occupied by the downlink channel transmission include the first symbol group, on a condition that the number of the TCI states of the first TCI state group is two, the time-domain resources occupied by the downlink channel transmission include the first symbol group and a second symbol group, and a second number of symbols of the second symbol group is equal to a first number of symbols of the first symbol group.

13. The method according to claim 11, wherein on a condition that the number of the TCI states of the first TCI state group is greater than one, a QCL parameter of the downlink channel transmission is based on the first TCI state group.

14. The method according to claim 11, wherein at least one CORESET is in the first CORESET pool and not in the second CORESET pool.

15. The method according to claim 14, wherein:

the method comprises receiving second control information and third control information; and transmitting second HARQ-ACK information in a second time-frequency resource and third HARQ-ACK information in a third time-frequency resource, the second control information indicates the second time-frequency resource, the second HARQ-ACK information is related to the second control information, the third control information indicates the third time-frequency resource, the third HARQ-ACK information is related to the third control information, the second control information indicates the second TCI state, the third control information indicates the third TCI state, the second slot is based on the second time-frequency resource, and the third slot is based on the third time-frequency resource, or on a condition that the number of the TCI states in the first TCI state group is one and the first control information is received on the at least one first control channel candidate in the first CORESET pool, a QCL parameter of the downlink channel transmission is based on the second TCI state, and on a condition that the number of the TCI states in the first TCI state group is one and the first control information is received on the at least one second control channel candidate in the second CORESET pool, the QCL parameter of the downlink channel transmission is based on the third TCI state, or on a condition that the number of the TCI states of the first TCI state group is greater than one, the first TCI state group includes the second TCI state and the third TCI state.

16. A method, comprising:

transmitting first control information that schedules a downlink channel transmission and that indicates a first time-frequency resource;

transmitting the downlink channel transmission; and receiving first HARQ-ACK information for the downlink channel transmission in the first time-frequency resource, wherein a first TCI state group is based on the first control information, wherein on a condition that a number of TCI states in the first TCI state group is one, a control channel candidate is monitored from a first time slot using the first TCI state group, and wherein the first time slot is based on the first time-frequency resource, and wherein the first control information is transmitted on at least one first control channel candidate in a first CORESET pool or at least one second control channel candidate in a second CORESET pool, wherein the at least one first control channel candidate is monitored from a second slot using a second TCI state and the at least one second control channel candidate is monitored from a third slot using a third TCI state.

17. The method according to claim 16, wherein the first control information indicates a first symbol group, time-domain resources occupied by the downlink channel transmission are based on the number of the TCI states of the first TCI state group and the first symbol group, on a condition that the number of the TCI states of the first TCI state group is one, the time-domain resources occupied by the downlink channel transmission include the first symbol group, on a condition that the number of the TCI states of the first TCI state group is two, the time-domain resources occupied by the downlink channel transmission include the first symbol group and a second symbol group, and a second number of symbols of the second symbol group is equal to a first number of symbols of the first symbol group.

18. The method according to claim 16, wherein on a condition that the number of the TCI states of the first TCI state group is greater than one, a QCL parameter of the downlink channel transmission is based on the first TCI state group.

19. The method according to claim 16, wherein at least one CORESET is in the first CORESET pool and not in the second CORESET pool.

20. The method according to claim 19, wherein:
the method comprises transmitting second control information and third control information; and receiving second HARQ-ACK information in a second time-frequency resource and third HARQ-ACK information in a third time-frequency resource, wherein the second control information indicates the second time-frequency resource, the second HARQ-ACK information is related to the second control information, the third control information indicates the third time-frequency resource, the third HARQ-ACK information is related to the third control information, the second control information indicates the second TCI state, the third control information indicates the third TCI state, the second slot is based on the second time-frequency resource, and the third slot is based on the third time-frequency resource, or on a condition that the number of the TCI states in the first TCI state group is one and the first control information is transmitted on the at least one first control channel candidate in the first CORESET pool, a QCL parameter of the downlink channel transmission is based on the second TCI state, and on a condition that the number of the TCI states in the first TCI state group is one and the first control information is transmitted on the at least one second control channel candidate in the second CORESET pool, the QCL parameter of the downlink channel transmission is based on the third TCI state, or on a condition that the number of the TCI states of the first TCI state group is greater than one, the first TCI state group includes the second TCI state and the third TCI state.

* * * * *